(12) United States Patent
Fukuzawa et al.

(10) Patent No.: US 9,018,269 B2
(45) Date of Patent: Apr. 28, 2015

(54) PROCESS FOR PRODUCING EXPANDED POLYOLEFIN RESIN PARTICLES AND EXPANDED POLYOLEFIN RESIN PARTICLES

(71) Applicant: Kaneka Corporation, Osaka (JP)

(72) Inventors: Jun Fukuzawa, Osaka (JP); Takamasa Imai, Osaka (JP); Kiyoshi Mori, Osaka (JP)

(73) Assignee: Kaneka Corporation, Osaka (JP)

( * ) Notice: Subject to any disclaimer, the term of this patent is extended or adjusted under 35 U.S.C. 154(b) by 156 days.

(21) Appl. No.: 13/860,785

(22) Filed: Apr. 11, 2013

(65) Prior Publication Data

US 2013/0231409 A1    Sep. 5, 2013

Related U.S. Application Data

(62) Division of application No. 12/747,050, filed as application No. PCT/JP2008/071933 on Dec. 3, 2008, now Pat. No. 8,513,317.

(30) Foreign Application Priority Data

| Nov. 12, 2007 | (JP) | ................................ 2007-319308 |
| May 8, 2008 | (JP) | ................................ 2008-201859 |
| Nov. 1, 2008 | (JP) | ................................ 2008-003962 |

(51) Int. Cl.
| C08J 9/00 | (2006.01) |
| B29C 44/34 | (2006.01) |
| C08J 9/18 | (2006.01) |
| C08J 9/228 | (2006.01) |

(52) U.S. Cl.
CPC ........... *B29C 44/3461* (2013.01); *C08J 9/0061* (2013.01); *C08J 9/18* (2013.01); *C08J 2203/06* (2013.01); *C08J 2323/02* (2013.01); *C08J 2471/00* (2013.01); *C08J 9/228* (2013.01); *C08J 9/00* (2013.01)

(58) Field of Classification Search
CPC .............. C08J 9/00; C08J 9/0061; C08J 9/18; C08J 9/228; C08J 2203/06; C08J 2323/02; C08J 2471/00
See application file for complete search history.

(56) References Cited

U.S. PATENT DOCUMENTS

| 3,770,663 A | 11/1973 | Ueki et al. |
| 4,704,239 A | 11/1987 | Yoshimura et al. |
| 5,122,545 A | 6/1992 | Kuwabara et al. |
| 5,622,756 A | 4/1997 | Tokoro et al. |
| 6,133,331 A | 10/2000 | Oikawa et al. |
| 6,326,409 B1 | 12/2001 | Mihayashi et al. |
| 6,596,782 B1 | 7/2003 | Mogami et al. |
| 2004/0054042 A1 | 3/2004 | Iwamoto et al. |

FOREIGN PATENT DOCUMENTS

| EP | 0 019 021 A1 | 11/1980 |
| EP | 0 934 974 A1 | 8/1999 |
| EP | 1 061 096 A1 | 12/2000 |
| EP | 1 182 225 A1 | 2/2002 |
| EP | 1 262 513 A1 | 12/2002 |
| JP | 56-1344 B | 1/1981 |
| JP | 05-163381 | 6/1993 |
| JP | 08-59875 | 3/1996 |
| JP | 10-152574 | 6/1998 |
| JP | 10-298338 | 11/1998 |
| JP | 10-306179 | 11/1998 |
| JP | 11-106576 | 4/1999 |

OTHER PUBLICATIONS

European Search Report dated Jun. 13, 2014 for European Application No. EP 14 00 0668.
Supplementary European Search Report issued on Oct. 1, 2013, issued in European Application No. EP 08 86 0267.
International Search Report for PCT/JP2008/071933, mailed Feb. 24, 2009.
English Translation of International Preliminary Report on Patentability (Chapter I) of PCT Application No. PCT/JP2008/071933, dated Aug. 10, 2010.
Office Action for U.S. Appl. No. 12/747,050, dated Mar. 26, 2012.
Office Action for U.S. Appl. No. 12/747,050, dated Jun. 1, 2012.
Office Action for U.S. Appl. No. 12/747,050, dated Jul. 5, 2012.
Office Action for U.S. Appl. No. 12/747,050, dated Oct. 22, 2012.
Office Action issued May 7, 2014 in co-pending U.S. Appl. No. 13/778,231, filed Feb. 27, 2013.

*Primary Examiner* — Irina S Zemel
(74) *Attorney, Agent, or Firm* — Nixon & Vanderhye, PC

(57) ABSTRACT

A process for producing expanded polyolefin resin particles with use as a foaming agent of water contained in an aqueous dispersion medium. The process includes dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel. The polyolefin resin particles are composed of a polyolefin resin composition including polyolefin resin, polyvalent alcohol and a foam nucleating agent.

8 Claims, 1 Drawing Sheet

PROCESS FOR PRODUCING EXPANDED POLYOLEFIN RESIN PARTICLES AND EXPANDED POLYOLEFIN RESIN PARTICLES

This application a division of U.S. application Ser. No. 12/747,050 filed on 9 Jun. 2010 which is the U.S. national phase of International Application No. PCT/JP2008/071933 filed 3 Dec. 2008, which designated the U.S. and claims priority to Japan Application No. 2007-319308 filed 11 Dec. 2007; Japan Application No. 2008-003962 filed 11 Jan. 2008; and Japan Application No. 2008-201859 filed 5 Aug. 2008, the entire contents of each of which are hereby incorporated by reference.

TECHNICAL FIELD

The present invention relates to processes for producing expanded polyolefin resin particles and to expanded polyolefin resin particles produced by such processes. More specifically, the present invention relates to a process for producing expanded polyolefin resin particles that can be suitably used, for example, as raw materials for in-mold expanded molded products and to expanded polyolefin resin particles.

BACKGROUND ART

Conventionally, there has been known a process for producing expanded particles by dispersing polyolefin resin particles together with a foaming agent into an aqueous dispersion medium, impregnating the resin particles with the foaming agent at a constant pressure and constant temperature after raising the temperature, and then releasing them into a low-pressure atmosphere. As for the foaming agent, disclosed examples of such processes include processes that involve the use of volatile organic foaming agents such as propane and butane (e.g., Patent Literature 1) and processes that involve the use of inorganic gasses such as carbon dioxide, nitrogen, and air (e.g., Patent Literatures 2 and 3).

However, the volatile organic foaming agents are substances that are greater in global warming potential than carbon dioxide, and as such, they are not environmentally preferable. Further, the volatile organic foaming agents, such as propane and butane, have a capacity to plasticize polyolefin resin and therefore make it easy to attain a high expansion ratio, but because their plasticizing capacity is great, they tend to make it difficult to control the expansion ratio and crystal condition of expanded particles. Further, the volatile organic foaming agents are flammable substances, and as such, they make it necessary to make facilities explosion-proof, thus incurring high costs in facilities.

Meanwhile, use of the inorganic gases, such as nitrogen and air, results in the incapability of, even under high pressure, attaining an amount of impregnation sufficient for a higher level of expansion, due to their very low capacity to spread completely through polyolefin resin.

In order to overcome these disadvantages, processes that involve the use as a foaming agent of water used as a dispersion medium have been proposed as processes for economically producing expanded polyolefin resin particles that can be suitably used for production of in-mold expanded molded products.

Proposed as a process that involves the use of water as a foaming agent is a process for producing expanded crystalline polyolefin polymer particles by: dispersing crystalline polyolefin polymer particles containing 10 to 70% by weight of an inorganic filler into water, which serves as a dispersion solution, in a closed vessel; impregnating the crystalline polyolefin polymer particles with the water, which serves as a dispersion medium, at a pressure of not lower than the saturated vapor pressure of the dispersion liquid and a temperature of not higher than the melting point of the crystalline polyolefin polymer particles, while keeping the dispersion liquid in a high-pressure zone under such temperature conditions that the crystallization of the polymer particles progresses; and then releasing the dispersion liquid into a low-pressure zone (e.g., Patent Literature 4). However, the expanded particles that are obtained by this process contain the inorganic filler in large amounts, and therefore are extremely small in cell diameter and tend to have a higher open cell ratio. As such, they are not sufficient in fusion, surface appearance, and mechanical properties such as compressive strength when processed into in-mold expanded molded products.

Further proposed is a process for producing expanded polyolefin resin particles by: dispersing polyolefin resin particles containing either an aqueous inorganic substance or a hydrophilic polymer into water in a closed vessel; heating the resin particles up to or above the softening temperature of the resin particles to turn the resin particles into hydrous polyolefin resin particles; and then releasing the dispersion liquid into a low-pressure zone (e.g., Patent Literatures 5 to 10). According to the descriptions, this process makes it possible to obtain expanded polypropylene resin particles with a high expansion ratio under low pressure in the vessel while using water, carbon dioxide, nitrogen, or the like, which are environmentally friendly, as a foaming agent.

However, in the case of such polyolefin resin particles containing a water-soluble inorganic substance as described in Patent Literature 6, an increase in amount of addition of the water-soluble inorganic substance for the purpose of increasing the expansion ratio or, in particular, making the expansion ratio eight times or more as high tends to result accordingly in extremely smaller cells. In consequence, in-mold expanded molded products made from the resultant expanded particles suffer from such problems as lower fusibility between expanded particles, thus bringing about degradation in commercial value of the molded products and deterioration in the rate at which the molded products are produced. Further, since the expansion ratio and the cell diameter change in conjunction with each other, there are problems of difficulties, for example, with adjusting (controlling) only the expansion ratio with the cell diameter held constant, which imposes limitations on production of expanded particles having desired properties.

Expanded polypropylene resin particles produced with use of carbon dioxide with the moisture content of such polypropylene resin particles containing a hydrophilic polymer as described in Patent Literature 7 held at 8% by weight or higher suffer from the disadvantage of tending to shrink immediately after foaming due to their high moisture content.

Furthermore, although the processes of Patent Literature 5 to 7 for producing expanded polyolefin resin particles containing a hydrophilic polymer make it possible to obtain expanded polyolefin resin particles with a high expansion ratio under low pressure in the vessel while using environment-friendly water as a foaming agent, cells in the resulting expanded particles tend to be extremely small or nonuniform. In-mold expanded molded products made from the resultant expanded particles with a low expansion ratio have no particular problems. However, those made with a high expansion ratio under such molding conditions as a short molding cycle and a short curing time after molding in recent pursuit of lower production costs have such problems as wrinkles on their surfaces and distortion in their shapes due to their large dimensional shrinkage, thus bringing about degradation in their commercial value and deterioration in the rate at which they are produced.

Such polyolefin resin particles containing a hydrophilic polymer have the hydrophilic polymer added so that water is used as a foaming agent. However, because in general a hydrophilic polymer is poor in dispersibility in polyolefin resin particles, there are such disadvantages as occurrence of variations in expansion ratio of the expanded particles and proneness to poor fusion between expanded particles processed into in-mold expanded molded products.

Meanwhile, there is disclosed a process for producing expanded particles without extremely smaller cells by introducing carbon dioxide as a foaming agent into polymer particles containing a polypropylene glycol-polyethylene glycol polymer together with an inorganic substance (e.g., Patent Literature 11). Due to the low compatibility of the polypropylene glycol-polyethylene glycol polymer with polypropylene resin, the process tends to cause troubles such as occurrence of strand breakage due to poor dispersion in the step of preparing the polymer particles and fluctuation in the feed of a molten resin in an extruder. Therefore, the polypropylene glycol-polyethylene glycol polymer can only be added in a minute amount, and due to its low water absorption rate, there has been no choice but to resort to foaming by carbon dioxide. Further, because the polypropylene glycol-polyethylene glycol polymer used has a great average molecular weight, it has been necessary to use polypropylene resin having a melt index of not less than 10 g/10 min, so as to obtain expanded polypropylene resin particles having a high expansion ratio. Furthermore, there have been such disadvantages as proneness to a lower rate of fusion between expanded particles processed into molded products, degradation in heat resistance, and degradation in strength.

CITATION LIST

Patent Literature 1
Japanese Patent Application Publication, Tokukosho, No. 56-1344 B
Patent Literature 2
Japanese Patent Application Publication, Tokukohei, No. 4-64332 B
Patent Literature 3
Japanese Patent Application Publication, Tokukohei, No. 4-64334 B
Patent Literature 4
Japanese Patent Application Publication, Tokukosho, No. 49-2183 B
Patent Literature 5
Japanese Patent Application Publication, Tokukaihei, No. 3-223347 A
Patent Literature 6
International Publication No. WO 98/25996
Patent Literature 7
Japanese Patent Application Publication, Tokukaihei, No. 10-152574 A
Patent Literature 8
Japanese Patent Application Publication, Tokukaihei, No. 10-298338 A
Patent Literature 9
Japanese Patent Application Publication, Tokukaihei, No. 10-306179 A
Patent Literature 10
Japanese Patent Application Publication, Tokukaihei, No. 11-106576 A
Patent Literature 11
Japanese Patent Application Publication, Tokukaihei, No. 5-163381 A

SUMMARY OF INVENTION

Technical Problem

It is an object of the present invention to provide: a process for producing expanded polyolefin resin particles whose cells are not made nonuniform or extremely smaller as seen in the conventional expanded particles, which vary less in both cell diameter within each expanded particle and expansion ratio from one expanded particle to another, whose cell diameter and expansion ratio can be easily controlled independently, and which, when subjected to in-mold expansion molding, give in-mold expanded molded products satisfactory in fusibility and surface properties and high in dimensional accuracy. It is another object of the present invention to provide expanded polyolefin resin particles that are obtained by such a process.

Solution to Problem

As a result of their diligent study to solve the foregoing problems, the inventors found that expanded polyolefin resin particles whose cells are not made nonuniform or extremely smaller as has been the case conventionally, which vary less in cell diameter within each expanded particle, and whose cell diameter and expansion ratio have been adjusted can be produced with a low environmental load by: impregnating, with water, polyolefin resin particles composed of a polyolefin resin composition containing a particular substance and a foam nucleating agent; and expanding the polyolefin resin particles.

Furthermore, the inventors also found that concomitant use of carbon dioxide as a foaming agent in addition to the water makes the cells more satisfactory in uniformity and makes it easy to increase the expansion ratio.

That is, the present invention is as follows:

(1) A process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; polyethylene glycol in not less than 0.05 parts by weight to not more than 2 parts by weight to 100 parts by weight of the polyolefin resin; and a foam nucleating agent.

(2) A process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; polyvalent alcohol in not less than 0.05 parts by weight to not more than 2 parts by weight to 100 parts by weight of the polyolefin resin, the polyvalent alcohol having a carbon number of not less than 3 to not more than 6 and three or more hydroxyl groups; and a foam nucleating agent.

(3) A process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; a water-absorbing substance in not less than 0.01 part by weight to not more than 5 parts by weight to 100 parts by weight of the polyolefin resin, the water-absorbing substance having no function of forming foaming nuclei; and a foam nucleating agent.

(4) The process as set forth in any one of (1) to (3), wherein the polyolefin resin is polypropylene resin.

(5) The process as set forth in (4), wherein the polypropylene resin has a melt index of not less than 2 g/10 minutes to not more than 9 g/10 minutes.

(6) The process as set forth in any one of (1), (4), and (5), wherein the polyethylene glycol has an average molecular weight of not less than 200 to not more than 9,000.

(7) The process as set forth in any one of (1), (4), (5), and (6), wherein the polyethylene glycol has an average molecular weight of not less than 200 to not more than 600.

(8) The process as set forth in any one of (2), (4), and (5), wherein the polyvalent alcohol having a carbon number of not less than 3 to not more than 6 and three or more hydroxyl groups is one or more types selected from among glycerin, diglycerin, pentaerythritol, trimethylolpropane, sorbitol, and D-mannitol.

(9) The process as set forth in any one of (2), (4), (5), and (8), wherein the polyvalent alcohol having a carbon number of not less than 3 to not more than 6 and three or more hydroxyl groups is glycerin.

(10) The process as set forth in (9), wherein the glycerin is added in not less than 0.05 parts by weight to not more than 0.5 parts by weight to 100 parts by weight of the polyolefin resin.

(11) The process as set forth in any one of (3) to (5), wherein the water-absorbing substance having no function of forming foaming nuclei is a compound having a polyalkylene oxide structure.

(12) The process as set forth in (11), wherein the compound having a polyalkylene oxide structure is a copolymer containing a polyolefin block and a polyethylene oxide block.

(13) The process as set forth in any one of (3) to (5), wherein the water-absorbing substance having no function of forming foaming nuclei is at least one type selected from among bentonite, synthetic hectolite, and synthetic zeolite.

(14) The process as set forth in any one of (3) to (5), (11), and (12), wherein the water-absorbing substance having no function of forming foaming nuclei has a melting point of lower than 150° C.

(15) The process as set forth in any one of (1) to (14), wherein the polyolefin resin particles are composed of a polyolefin resin composition containing the foam nucleating agent in not less than 0.005 parts by weight to not more than 2 parts by weight to 100 parts by weight of the polyolefin resin.

(16) The process as set forth in any one of (1) to (15), the process involving concomitant use of carbon dioxide as a foaming agent.

(17) The process as set forth in (3), wherein expanded polypropylene resin particles having a volatile content of not less than 0.1% by weight to 7% by weight, an expansion ratio of not less than 8 times to not more than 25 times, an average cell diameter of not less than 130 µm to not more than 500 µm, and a cell diameter variation of less than 0.4 are obtained by: dispersing the polypropylene resin particles together with the aqueous dispersion medium into the closed vessel; heating the polypropylene resin particles up to or above the softening temperature of the polypropylene resin particles; and releasing the polypropylene resin particles into a zone whose pressure is lower than the internal pressure of the closed vessel, the polypropylene resin particles containing: polypropylene resin having a melt index of not less than 2 g/10 minutes to not more than 9 g/10 minutes; a water-absorbing substance in not less than 0.01 part by weight to not more than 5 parts by weight to 100 parts by weight of the polypropylene resin, the water-absorbing substance having no function of forming foaming nuclei; and a foam nucleating agent in not less than 0.005 parts by weight to not more than 1 part by weight to 100 parts by weight of the polypropylene resin.

(18) Expanded polyolefin resin particles that are obtained by a process as set forth in any one of (1), (4) to (7), (15), and (16), the expanded polyolefin resin particles containing not less than 0.05% by weight to not more than 2% by weight of the polyethylene glycol, the expanded polyolefin resin particles having an expansion ratio of not less than 10 times to not more than 45 times and an average cell diameter of not less than 50 µm to not more than 800 µm, the expanded polyolefin resin particles having a crystal structure that exhibits two or more melting points on a DSC curve that is obtained by raising a temperature of the expanded polyolefin resin particles from 40° C. to 220° C. at a heating rate of 10° C./min in differential scanning calorimetry.

(19) Expanded polyolefin resin particles that are obtained by a process as set forth in any one of (2), (4), (5), (8), (9), (10), (15), and (16), the expanded polyolefin resin particles containing not less than 0.05% by weight to not more than 2% by weight of the polyvalent alcohol having a carbon number of not less than 3 to not more than 6 and three or more hydroxyl groups, the expanded polyolefin resin particles having an expansion ratio of not less than 10 times to not more than 45 times and an average cell diameter of not less than 50 µm to not more than 800 µm, the expanded polyolefin resin particles having a crystal structure that exhibits two or more melting points on a DSC curve that is obtained by raising a temperature of the expanded polyolefin resin particles from 40° C. to 220° C. at a heating rate of 10° C./min in differential scanning calorimetry.

(20) Expanded polyolefin resin particles that are obtained by a process as set forth in any one of (3), (4), (5), (11) to (16), the expanded polyolefin resin particles containing not less than 0.01% by weight to not more than 5% by weight of the water-absorbing substance having no function of forming foaming nuclei, the expanded polyolefin resin particles having an expansion ratio of not less than 8 times to not more than 45 times and an average cell diameter of not less than 50 µm to not more than 800 µm, the expanded polyolefin resin particles having a crystal structure that exhibits two or more melting points on a DSC curve that is obtained by raising a temperature of the expanded polyolefin resin particles from 40° C. to 220° C. at a heating rate of 10° C./min in differential scanning calorimetry.

(21) The expanded polyolefin resin particles as set forth in any one of (18) to (20), the expanded polyolefin resin particles having an expansion ratio of not less than 10 times to not more than 25 times and an average cell diameter of not less than 130 μm to not more than 500 μm.

(22) The expanded polyolefin resin particles as set forth in any one of (18) to (21), the expanded polyolefin resin particles having a volatile content of not less than 0.1% by weight to not more than 7% by weight and a cell diameter variation of less than 0.4.

(23) Expanded polypropylene resin particles including: polypropylene resin; a water-absorbing substance in not less than 0.01 part by weight to not more than 5 parts by weight to 100 parts by weight of the polypropylene resin, the water-absorbing substance having no function of forming foaming nuclei; and a foam nucleating agent in not less than 0.005 parts by weight to not more than 1 part by weight to 100 parts by weight of the polypropylene resin, the expanded polypropylene resin particles having a melt index of not less than 2 g/10 minutes to not more than 12 g/10 minutes, a volatile content of not less than 0.1% by weight to not more than 7% by weight, an expansion ratio of not less than 8 times to not more than 25 times, an average cell diameter of not less than 130 μm to not more than 500 μm, and a cell diameter variation of less than 0.4.

(24) The expanded polypropylene resin particles as set forth in (23), the expanded polypropylene resin particles having a crystal structure that exhibits two or more melting points on a DSC curve that is obtained by raising a temperature of the expanded polypropylene resin particles from 40° C. to 220° C. at a heating rate of 10° C./min in differential scanning calorimetry.

(25) Expanded polyolefin resin particles (referred to as "expanded polyolefin resin particles (P)") that are obtained by a process as set forth in any one of (3) to (5) and (11) to (17), in comparison with expanded polyolefin resin particles (referred to as "expanded polyolefin resin particles (Q)") produced in just the same way except that the water-absorbing substance having no function of forming foaming nuclei is not contained, the expanded polyolefin resin particles (P) having a volatile content and an average cell diameter that satisfy the following formulas (E1) and (E2): (E1): Volatile Content of Expanded Polyolefin Resin Particles (P)≥Volatile Content of Expanded Polyolefin Resin Particles (Q)×1.1; and (E2) Average Cell Diameter of Expanded Polyolefin Resin Particles (P)≥Average Cell Diameter of Expanded Polyolefin Resin Particles (Q)×0.7, the expanded polyolefin resin particles (P) having a melt index of not less than 1 g/10 minutes to not more than 12 g/10 minutes.

(26) The expanded polyolefin resin particles as set forth in any one of (18) to (22) and (25), the expanded polyolefin resin particles being expanded polypropylene resin particles.

(27) A polyolefin resin in-mold expanded molded product that is obtained by filling a mold with expanded polyolefin resin particles as set forth in any one of (18) to (26) and heating the expanded polyolefin resin particles.

Advantageous Effects of Invention

According to the present invention, a process for producing expanded polyolefin resin particles with use of water as a foaming agent or, in particular, with use of water and carbon dioxide as foaming agents makes it possible to obtain expanded polyolefin resin particles with a high expansion ratio whose cells are made uniform without being made extremely smaller and whose cell diameter and expansion ratio can be easily controlled independently. Further, use of expanded polyolefin resin particles of the present invention makes it possible to obtain in-mold expanded molded products high in rate of fusion, small in gap between particles, shrinkage, and distortion, beautiful in surface properties, and high in dimensional accuracy. In particular, in-mold expanded molded products molded after increasing the expansion ratio of expanded polyolefin resin particles of the present invention by two-stage foaming are better than conventional ones molded with use of water as a foaming agent.

DESCRIPTION OF EMBODIMENTS

Figure 1:
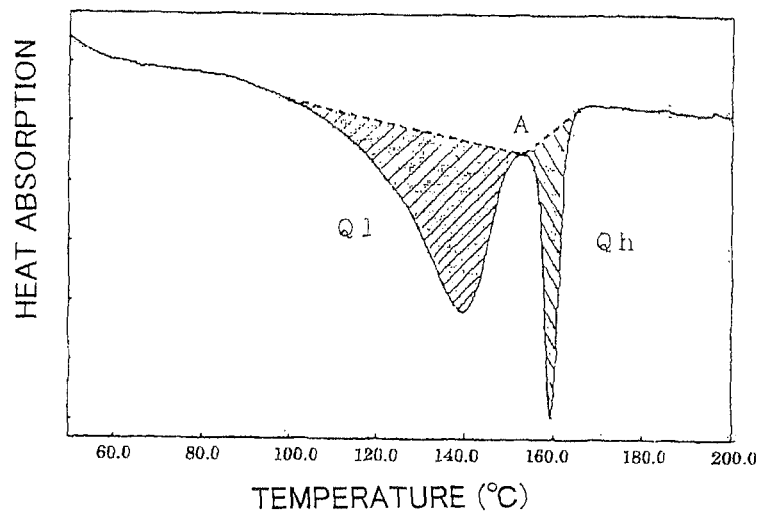
FIG. 1 is an example of a DSC curve that is obtained by raising the temperature of not less than 1 mg to not more than 10 mg of expanded polypropylene resin particles of the present invention from 40° C. to 220° C. at a heating rate of 10° C./min in differential scanning calorimetry, where A is the point at which the smallest quantity of heat absorption is reached between the two melting peaks of the DSC curve, Qh is the quantity of heat at the melting peak on the higher-temperature side, which is the right one of the two areas surrounded by the DSC curve and tangents to the DSC curve drawn from the point A, and Ql is the quantity of heat at the melting peak on the lower-temperature side, which is the left one of the two areas.

A first aspect of the present invention relates to a process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; polyethylene glycol in not less than 0.05 parts by weight to not more than 2 parts by weight to 100 parts by weight of the polyolefin resin; and a foam nucleating agent.

A second aspect of the present invention relates to a process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; polyvalent alcohol in not less than 0.05 parts by weight to not more than 2 parts by weight to 100 parts by weight of the polyolefin resin, the polyvalent alcohol having a carbon number of not less than 3 to not more than 6 and three or more hydroxyl groups; and a foam nucleating agent.

A third aspect of the present invention relates to a process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition including: polyolefin resin; a water-absorbing substance in not less than 0.01 part by weight to not more than 5 parts by weight to 100 parts by weight of the polyolefin resin, the water-absorbing substance having no function of forming foaming nuclei; and a foam nucleating agent.

The polyethylene glycol in the present invention is a nonionic water-soluble polymer having an ethylene glycol polymerized structure, and has an average molecular weight of approximately not more than 50,000. It is preferable that the polyethylene glycol that is used in the present invention have an average molecular weight of not less than 200 to not more than 9,000, or more preferably not less than 200 to not more than 600. In general, glycols are slightly inferior in compatibility with polyolefin resin. However, such polyethylene glycol having an average molecular weight of not less than 200 to not more than 9,000 is dispersed comparatively satisfactorily even in the step of kneading a mixture of the polyolefin resin and the polyethylene glycol in an extruder and producing the polyolefin resin particles by a strand cut method, and therefore tends to cause less troubles such as occurrence of strand breakage and instability in the feed of the molten resin. Furthermore, the resulting expanded polyolefin resin particles tend to have uniform cells and to vary less in expansion ratio. An in-mold expanded molded product obtained by in-mold molding of such expanded polyolefin resin particles tends to be high in rate of fusion, beautiful in surface, and low in rate of dimensional shrinkage.

Selection of polyethylene glycol having such a low average molecular weight of not less than 200 to not more than 600 leads to an increase in impregnation ability of carbon dioxide, which is suitably used concomitantly with water, and therefore tends to give expanded polyolefin resin particles having a high expansion ratio.

Polyethylene glycol having an average molecular weight of more than 50,000 is low in dispersibility into polyolefin resin, thus causing great variations in cell diameter within each expanded polyolefin resin particle and decreasing the amount of water with which polyolefin resin particles are impregnated. The resulting expanded polyolefin resin particles tend to have a lower expansion ratio.

It should be noted that it is possible to concomitantly use polyethylene glycol having a different molecular weight. However, such a similar substance to glycols as a polypropylene glycol-polyethylene glycol polymer is poor in dispersibility into polyolefin resin, therefore can only be added in a minute amount, and furthermore, due to its low water absorption rate, is not suitable for concomitant use. Further, although cross-linked polyalkylene oxide is commercially available, it incurs very high costs because it needs to be added in a large amount for moisture content and is an expensive substance.

It should be noted that the average molecular weight of polyethylene glycol can be measured by using a liquid chromatograph mass spectrometer such as an LCQ Advantage manufactured by Thermo Fisher Scientific K.K.

In the present invention, the polyvalent alcohol having a carbon number of not less than 3 to not more than 6 and three or more hydroxyl groups is such that the moisture content can be increased simply by adding the polyvalent alcohol in a small amount into the polyolefin resin and expanded particles having a high expansion ratio can be obtained. Specifically, examples of the polyvalent alcohol having a carbon number of not less than 3 to not more than and three or more hydroxyl groups include glycerin, 1,2,4-butanetriol, diglycerin, pentaerythritol, trimethylolpropane, sorbitol, D-mannitol, erythritol, hexanetriol, xylitol, D-xylose, inositol, fructose, galactose, glucose, and mannose, etc. Among them, it is preferable that the polyvalent alcohol having a carbon number of not less than 3 to not more than 6 and three or more hydroxyl groups be one or more types selected from among glycerin, diglycerin, pentaerythritol, trimethylolpropane, sorbitol, and D-mannitol, or more preferably glycerin. Glycerin is a substance that is highly hygroscopic, is used as a food additive, and is drastically safe to the human body, which makes it possible to use expanded polyolefin resin particles of the present invention as raw materials for in-mold expanded molded products that are used in food contact applications. Further, glycerin has low environmental impact because it is easily decomposable even when eluted into discharged water during production. Glycerin is suitable also because it is easily available and inexpensive.

In general, a hydrophilic substance is slightly inferior in compatibility with polyolefin resin. However, the polyvalent alcohol having a carbon number of not less than 3 to not more than 6 and three or more hydroxyl groups, as used in the present invention, is dispersed comparatively satisfactorily even in the step of blending it with the polyolefin resin, kneading the mixture in an extruder, and producing the polyolefin resin particles by a strand cut method, and therefore tends to cause less troubles such as occurrence of strand breakage and instability in the feed of the molten resin. Furthermore, the resulting expanded polyolefin resin particles have uniform cells and vary less in expansion ratio. An in-mold expanded molded product obtained by in-mold expansion molding of such expanded polyolefin resin particles is high in rate of fusion, beautiful in surface, and low in rate of dimensional shrinkage.

In the present invention, the water-absorbing substance having no function of forming foaming nuclei refers to a substance that has no function of forming foaming nuclei and has water-absorbing properties.

The phrase "having no function of forming foaming nuclei" in the present invention refers to a substance that has a relationship "Average Cell Diameter of (a)≧Average Cell Diameter of (b)×0.7" between expanded polyolefin resin particles (a) containing the substance in 0.5 parts by weight to 100 parts by weight of the polyolefin resin and expanded polyolefin resin particles (b) obtained by expanding the polyolefin resin particles under just the same conditions except that the substance is not contained. The average cell diameter in this case is an average cell diameter L(av) measured according to a method mentioned later.

In the present invention, the substance that has water-absorbing properties encompasses, in general, substances that have water-absorbing properties, hygroscopic properties, and solubility to or compatibility with water. Examples of such substances include a water-soluble polymer, a water-absorbing polymer, a hydrophilic polymer, a water-soluble organic substance, a water-absorbing organic substance, a hydrophilic organic substance, a water-soluble inorganic substance, a water-absorbing inorganic substance, and a hydrophilic inorganic substance, etc.

These substances are not particularly limited in water absorption rate. However, from the point of view of improving the expansion ratio of the resulting expanded polyolefin resin particles, it is preferable the water absorption rate be not lower than 0.1%, or more preferably not lower than 0.5%. Such a water absorption rate is measured, for example, in conformity to ASTM D570.

In a conventional technique that involves the addition of a water-soluble inorganic substance or the like, it has been possible to increase the expansion ratio of expanded particles by increasing the amount of addition of the water-soluble inorganic substance. However, because the water-soluble inorganic substance has a function of forming foaming nuclei, a significant increase in number of cells is observed along with an increase in expansion ratio, with the result that the average cell diameter is very small. In consequence, the cells tend to be small in wall thickness. An in-mold expanded molded product obtained by in-mold expansion molding of such expanded particles is low in rate of fusion and large in gap between particles, shrinkage, and distortion.

As opposed to this, since the present invention uses the water-absorbing substance having no function of forming foaming nuclei, there is no significant decrease in average cell diameter even when the expansion ratio is increased by increasing the amount of addition of the water-absorbing substance. An in-mold expanded molded product obtained by in-mold expansion molding of such expanded particles produced by the process of the present invention is high in rate of fusion, small in gap between particles, shrinkage, and distortion to be good in appearance and excellent.

The foregoing has described the water-absorbing substance having no function of forming foaming nuclei, as used in the present invention, in terms of the absence of the function of forming foaming nuclei and in terms of water-absorbing properties. Specific examples of the water-absorbing substance having no function of forming foaming nuclei include such substances as below.

That is, the specific examples include: (A) compounds each having a polyalkylene oxide or polyethylene oxide structure such a copolymer (e.g., marketed as Pelestat by Sanyo Chemical Industries, Ltd.) containing polyalkylene oxide as a block portion, polypropylene glycol, polyethylene glycol, or cross-linked polyalkylene oxide; (B) hydrophilic polymers such as sodium polyacrylate, cellulose, carboxymethylcellulose sodium, and polyvinyl alcohol; and (C) inorganic compounds such as zeolite, bentonite, and synthetic hectolite (Laponite).

The specific examples further include (D) surfactants such as: (i) cationic surfactants such as aliphatic amine salt, hydroxyalkyl monoethanolamine salt, and aliphatic quaternary ammonium salt; (ii) anionic surfactants such as alkyl sulfonate, alkyl benzene sulfonate, alkyl naphthalene sulfonate, sulfosuccinate, α-olefin sulfonate, N-acyl sulfonate, alkyl sulfate, alkyl ether sulfate, alkyl aryl ether sulfate, alkyl amide sulfate, alkyl phosphate, alkyl ether phosphate, alkyl aryl ether phosphate, alkyl ether carboxylate, N-acyl amino-acid salt; (iii) nonionic surfactants such as alkyl and alkyl aryl polyoxyethylene ether, alkyl aryl formaldehyde condensed polyoxyethylene ether, polyoxyethylene polyoxypropyl alkyl ether, polyoxyethylene ether of glycerin ester, polyoxyethylene ether of sorbitan ester, polyoxyethylene ether of sorbitol ester, polyethylene glycol fatty ester, glycerin ester, higher fatty acid glycerin ester, polyglycerin ester, sorbitan ester, propylene glycol ester, sucrose esters, aliphatic alkanol amide, polyoxyethylene fatty amide, polyoxyethylene alkyl amine, and amine oxide; and (iv) ampholytic surfactants such as carboxy betaine, imidazolium betaine, and aminocarboxylate.

These water-absorbing substances having no function of forming foaming nuclei may be used alone or in combination of two or more of them.

Among them, it is more preferable that the water-absorbing substance having no function of forming foaming nuclei be either a compound having a polyalkylene oxide structure or glycerin. In particular, it is preferable that the water-absorbing substance having no function of forming foaming nuclei be either polyethylene glycol or glycerin. Polyethylene glycol and glycerin are less toxic substances, and the resultant in-mold expanded molded product can be used in food contact applications.

Another preferred compound having a polyalkylene oxide structure is a copolymer containing polyalkylene oxide as a block portion, in particular, a polyolefin-polyether block copolymer (such as a copolymer containing a polyolefin block and a polyalkylene oxide block). In particular, a polyolefin-polyethylene oxide block copolymer whose polyether block portion has a polyethylene oxide structure is more preferable. A specific example is a copolymer marketed as Pelestat by Sanyo Chemical Industries, Ltd.

Because such a copolymer has a polyolefin block, it is satisfactory in compatibility with polyolefin resin. Further, because it is a solid, it is satisfactory in handling and does not cause defective feeding during kneading or extrusion. In consequence, there does not occur uneven discharge during extrusion, and resin particles uniform in shape can be produced by a strand cut method. When such resin particles are expanded, the resulting expanded particles are uniform in cell diameter and less variable in expansion ratio. An in-mold expanded molded product obtained by in-mold expansion molding of such expanded particles is small in gap between particles, shrinkage, and distortion to be good in appearance, and tends to be high in rate of fusion and sufficient in dimensional stability under heating.

Further, other preferable examples of the water-absorbing compound having no function of forming foaming nuclei include bentonite, synthetic hectolite, and synthetic zeolite, etc. In general, an inorganic substance has a function of forming foaming nuclei. However, although these substances are inorganic substances, they are unexpectedly low in function of forming foaming nuclei, and therefore can be suitably used.

It is preferable that the polyethylene glycol, the polyvalent alcohol having a carbon number of not less than 3 to not more than 6 and three or more hydroxyl groups, and the water-absorbing compound having no function of forming foaming nuclei, which have been described above, have a melting point of lower than 150° C. A substance having a melting point of lower than 150° C. is preferable because it is highly likely to exist not as a solid but as a liquid during foaming and therefore is even lower in function of forming foaming nuclei, thus making it easy to control the cell diameter and the expansion ratio. A substance having a melting point of not lower than 150° C. tends to express the function of forming foaming nuclei and, as a result, may cause degradation in fusibility and surface properties such as gaps between particles, shrinkage, and distortion when processed into an in-mold expanded molded product.

Specific examples of such a substance having a melting point of lower than 150° C. include polyethylene glycol (which has a melting point of −13° C. when it has an average molecular weight of 300), glycerin (which has a melting point of 20° C.), and the aforementioned Pelestat (which has a melting point of 135° C., in the case of Pelestat 303), which is a copolymer having a polyolefin block and a polyalkylene oxide block, etc.

In the present invention, the polyethylene glycol, the polyvalent alcohol having a carbon number of not less than 3 to not more than 6 and three or more hydroxyl groups, and the water-absorbing compound having no function of forming foaming nuclei are added in not less than 0.05 parts by weight to not more than 2 parts by weight, not less than 0.05 parts by weight to not more than 2 parts by weight, and not less than 0.01 part by weight to not more than 5 parts by weight to 100 parts by weight of the polyolefin resin, respectively.

In any case, adjustment of the amount of addition makes it possible to adjust the moisture content and the volatile content and change the expansion ratio. However, if the amount of addition is less than those specified above, the function of water or carbon dioxide to improve the expansion ratio will become less effective, and the function of uniforming the cell diameter will also become less effective. On the other hand, if the amount of addition exceeds those specified above, there will be shrinkage in the expanded polyolefin resin particles, or there will be insufficient dispersion into the polyolefin resin.

It is more preferable that the polyethylene glycol, the polyvalent alcohol having a carbon number of not less than 3 to not more than 6 and three or more hydroxyl groups, and the water-absorbing compound having no function of forming foaming nuclei be added in not less than 0.05 parts by weight to not more than 1 part by weight, even more preferably in not less than 0.1 part by weight to not more than 0.5 parts by weight.

However, the smaller average molecular weight polyethylene glycol has, the more likely it is to increase the moisture content. Polyethylene glycol having a great average molecular weight tends to be added in a larger amount for equal moisture content. Therefore, the molecular weight and amount of addition of polyethylene glycol that is used can be selected in balance with a desired expansion ratio, a desired moisture content, and desired properties.

Further, when the polyvalent alcohol having a carbon number of not less than 3 to not more than 6 and three or more hydroxyl groups is glycerin, it is preferable that glycerin be added in not less than 0.05 parts by weight to not more than 0.5 parts by weight to 100 parts by weight of the polyolefin resin.

It should be noted here that the content of the polyvalent alcohol having a carbon number of not less than 3 to not more than 6 and three or more hydroxyl groups in the polyolefin resin particles and the expanded polyolefin resin particles can be determined by using an HPLC apparatus (e.g., high-performance liquid chromatography: prominence high-pressure gradient system; manufactured by Shimadzu Corporation) in which an ESLD (evaporate light scattering detector) is used.

It should be noted that the polyethylene glycol, the polyvalent alcohol having a carbon number of not less than 3 to not more than 6 and three or more hydroxyl groups, and the water-absorbing compound having no function of forming foaming nuclei are added in amounts weighed with no water absorbed therein.

The foam nucleating agent that is used in the present invention refers to a substance that facilitates the formation of cell nuclei during foaming, example of which include talc, calcium carbonate, silica, kaolin, barium sulfate, calcium hydroxide, aluminum hydroxide, aluminum oxide, titanium oxide, zeolite, aliphatic metal salts such as calcium stearate and barium stearate, melamine, and metal borate, etc. These foam nucleating agents preferably have a sharp grain size distribution, and may be used alone or in combination of two or more of them.

Among them, talc, metal borate, and calcium carbonate are preferable. In particular, talc is preferred because use of talc, which is inexpensive and well-suited to the water-absorbing compound having no function of forming foaming nuclei, improves the dispersibility into the polyolefin resin of the water-absorbing compound having no function of forming foaming nuclei, and makes it easy to obtain an in-mold expanded molded product uniform in cell diameter.

Although the amount of addition is adjusted appropriately depending on the foaming agent used, the desired expansion ratio, and the like, it is preferable that the foam nucleating agent be added in not less than 0.005 parts by weight to not more than 2 parts by weight, or more preferably not less than 0.01 part by weight to not more than 1 part by weight, to 100 parts by weight of the polyolefin resin. If the foam nucleating agent is added in less than 0.005 parts by weight, the expansion ratio will not be able to be increased, or there will be degradation in uniformity in cell diameter. If the foam nucleating agent is added in more than 2 parts by weight, the in-mold expanded molded product will be so small in average cell diameter as to be defective.

When the foam nucleating agent is talc, it is preferable that talc be used in not less than 0.02 parts by weight to not more than 0.5 parts by weight to 100 parts by weight of the polyolefin resin, use of such an amount of talc makes it easy to attain the desired average cell diameter so that the in-mold expanded molded product is satisfactory.

It is preferable that the polyolefin resin that is used in the present invention be polyolefin resin such as polyethylene resin or polypropylene resin, or more preferably polypropylene resin.

Examples of the polyethylene resin include high-density polyethylene, medium-density polyethylene, low-density polyethylene, linear low-density polyethylene, an ethylene homopolymer, and an ethylene-α-olefin copolymer, etc. Examples of the α-olefin here include α-olefins having a carbon number of 3 to 15, etc., and these may be used alone or in combination of two or more of them.

Examples of the polypropylene resin include a propylene homopolymer, a propylene-α-olefin random copolymer, and a propylene-α-olefin block copolymer, etc. Examples of the α-olefin here include α-olefins having a carbon number of 2 and 4 to 15, and these may be used alone or in combination of two or more of them. Further, the aforementioned propylene homopolymer, propylene-α-olefin random copolymer, propylene-α-olefin block copolymer may be used in combination of two or more of them.

Among them, in particular, those propylene-ethylene random copolymers, propylene-ethylene-butene-1 random copolymers, and propylene-butene-1 random copolymers whose comonomer content other than propylene ranges from 1 to 5% by weight exhibit satisfactory expandability, and therefore can be suitably used. Further, the copolymers have such properties as to be easily impregnated with carbon dioxide, and therefore are suitable.

Although the polyolefin resin that is used in the present invention is not particularly limited in melt index, it is preferable that the polyolefin resin have a melt index of not less than 0.5 g/10 minutes to not more than 30 g/10 minutes, more preferably not less than 2 g/10 minutes to not more than 9 g/10 minutes, or most preferably, especially when the polyolefin resin is polypropylene resin, not less than 4 g/10 minutes to not more than 8 g/10 minutes. If the polyolefin resin has a melt index of less than 0.5 g/10 minutes, the resulting expanded particles are neither high in expansion ratio nor uniform in cell. On the other hand, if the polyolefin resin has a melt index of more than 30 g/10 minutes, there will be such an improvement in expandability that the resulting expanded particles are likely to have a high expansion ratio; however, there will be breakage of foam cells, with the result that the expanded particles become high in open cell ratio and nonuniform in cell.

It should be noted that when the polyolefin resin is polypropylene resin, the melt index of the polyolefin resin in the present invention is a value measured at a temperature of 230° C. with a load of 2.16 kg in conformity to JIS K7210; and when the polyolefin resin is polyethylene resin, the melt index of the polyolefin resin in the present invention is a value measured at a temperature of 190° C. with a load of 2.16 kg in conformity to JIS K7210.

It is preferable that the polyolefin resin that is used in the present invention be polypropylene resin, because it makes it easy to obtain expanded particles excellent in expandability and moldability and excellent in mechanical strength and heat resistance when processed into an in-mold expanded molded product.

It is preferable that the polypropylene resin have a melting point of not lower than 130° C. to not higher than 165° C., or more preferably not lower than 135° C. to not higher than 155° C. If the polypropylene resin has a melting point of lower than 130° C., it tends to be insufficient in heat resistance and mechanical strength. On the other hand, if the polypropylene resin has a melting point of higher than 165° C., it tends to make it difficult to secure fusion between expanded particles during in-mold expansion molding.

The term "melting point" here means the peak temperature of an endothermic peak on a DSC curve that is obtained by raising the temperature of not less than 1 mg to not more than 10 mg of polypropylene resin from 40° C. to 220° C. at a heating rate of 10° C./min in differential scanning calorimetry, lowering the temperature to 40° C. at a heating rate of 10° C./min, and then again raising the temperature to 220° C. at a heating rate of 10° C./min.

In the present invention, additives other than the polyethylene glycol, the polyvalent alcohol having a carbon number of not less than 3 to not more than 6 and three or more hydroxyl groups, the water-absorbing substance having no function of forming foaming nuclei, and the foam nucleating agent can be added in such amounts as not to impair the effects of the present invention. Examples of additives include a compatibilizing agent, an antistatic agent, a colorant, a stabilizer, a weatherproofer, and a flame retardant, etc.

In the present invention, the polyethylene glycol, the polyvalent alcohol having a carbon number of not less than 3 to not more than 6 and three or more hydroxyl groups, the water-absorbing compound having no function of forming foaming nuclei, and the polyolefin resin, which have been described above, are used as the polyolefin resin particles.

The polyolefin resin particles can be obtained by using a well-known method, e.g., by blending (a) polyethylene glycol, (b) the polyvalent alcohol having a carbon number of not less than 3 to not more than 6 and three or more hydroxyl groups, or (c) the water-absorbing compound having no function of forming foaming nuclei and the foam nucleating agent with the polyolefin resin, melting and kneading the mixture in an extruder, extruding it through a die, cooling it, and then cutting it into polyolefin resin particles with a cutter. When a substance selected as the polyethylene glycol, the polyvalent alcohol having a carbon number of not less than 3 to not more than 6 and three or more hydroxyl groups, or the water-absorbing compound having no function of forming foaming nuclei is a substance that takes the form of a liquid or wax (semiliquid) at room temperature (e.g., polyethylene glycol having a molecular weight of not more than 3,000), the polyolefin resin particles may be obtained either by using the aforementioned method or by supplying a fixed quantity of such a substance in the form of a liquid to the molten polyolefin resin either in the input hopper area of the extruder or in the middle of the extruder and kneading the mixture. When added in the form of a liquid, a substance that takes the form of wax at low temperatures, such as polyethylene glycol having a molecular weight of 1,000 to 3,000 or glycerin, only has to be added after being heated and melted.

Alternatively, in the case of a substance that tends to evaporate at extrusion temperature, such as polyethylene glycol having a molecular weight of not more than 4,000, it is desirable to set the cylinder and die area of the extruder to a low temperature of 250° C. or lower so that the substance evaporates less.

It should be noted that it is possible to prepare a masterbatch of the polyethylene glycol, the polyvalent alcohol having a carbon number of not less than 3 to not more than 6 and three or more hydroxyl groups, or the water-absorbing compound having no function of forming foaming nuclei and the foam nucleating agent with polyolefin resin, to blend the masterbatch with polyolefin resin so that they are finally added in desired amounts, and to knead and melt the mixture in the extruder to give polyolefin resin particles.

The following describes a process of the present invention for producing expanded polyolefin resin particles.

Expanded polyolefin resin particles in the present invention are produced by: dispersing such polyolefin resin particles produced as mentioned above together with an aqueous dispersion medium into a closed vessel; heating the polyolefin resin particles up to or above the softening temperature of the polyolefin resin particles; and releasing the polyolefin resin particles into a zone whose pressure is lower than an internal pressure of the closed vessel. It should be noted here that because water contained in the aqueous dispersion medium serves as a foaming agent and inorganic gas such as carbon dioxide, nitrogen, or air is injected into the closed vessel at any stage before the release into the low-pressure zone, it is possible to increase the internal pressure of the closed vessel, to regulate the rate of pressure release during the foaming, and to adjust the expansion ratio and the average cell diameter.

In a more preferred aspect of the present invention, i.e., when carbon dioxide is further added as a foaming agent, the polypropylene resin particles, water, and solid carbon dioxide (dry ice) may be poured into the closed vessel or, after the polyolefin resin particles and water are poured into the closed vessel, gaseous or liquid carbon dioxide may be introduced into the closed vessel at any stage before the release into the low-pressure zone. Alternatively, a combination of these methods can be employed.

Such concomitant use of water and carbon dioxide as foaming agents makes it easy to increase foaming power, and therefore makes it possible to reduce the amount of addition of the foam nucleating agent in attaining a high expansion ratio, thus giving expanded particles large in average cell diameter and satisfactory in secondary expandability. Further, carbon dioxide is presumed to become likely to be retained simultaneously with water in the polyethylene glycol, the polyvalent alcohol having a carbon number of not less than 3 to not more than 6 and three or more hydroxyl groups, or the water-absorbing compound having no function of forming foaming nuclei. This is preferable because it becomes possible to form cells uniform in diameter, and it becomes easier to control the cell diameter and the expansion ratio.

The present invention uses water as a foaming agent, and "use of water as a foaming agent" can be determined by measuring the moisture content mentioned later. The moisture content can be measured by another method, e.g., by using a polymer moisture measuring system or Karl Fischer moisture measuring system to measure the expanded particles immediately after the foaming.

It is preferable carbon dioxide that is used concomitantly as a foaming agent in the present invention be added in not less than 0.5 parts by weight to not more than 30 parts by weight, or more preferably not less than 2 parts by weight to not more than 20 parts by weight, to 100 parts by weight of the polyolefin resin particles. If carbon dioxide is added in less than 0.5 parts by weight, the effect of concomitant use with water as a foaming agent is unlikely to be exerted. On the other hand, if carbon dioxide is added in more than 30 parts by weight, the foaming power becomes so high that the resulting expanded particles tend to have a higher open cell ratio, e.g., to suffer from cell breakage.

In the present invention, it is essential to use water as a foaming agent, and it is preferable to concomitantly use water and carbon dioxide as foaming agents. However, it is also possible to supplementarily use other physical foaming agents as needed, for example, to use saturated hydrocarbons having a carbon number of 3 to 5, dimethyl ether, alcohols such as methanol and ethanol, which have a boiling point lower than the expandable temperature, and inorganic foaming agents such as air and nitrogen.

It should be noted that it is the water contained in the aqueous dispersion medium in the closed vessel that is used as a foaming agent.

Further, the other physical foaming agents may be introduced before or during the heating after dispersing the polyolefin resin particles together with the aqueous dispersion medium into the closed vessel, or may be introduced after the heating or immediately before the foaming. Alternatively, the other physical foaming agents may be introduced during the foaming so that the internal pressure of the closed vessel will not decrease during the foaming. Furthermore, the other physical foaming agents may be introduced in several batches.

From the point of view of sufficiently impregnating the polyolefin resin particles with the foaming agents for higher foaming power, it is preferable that the foaming agents be introduced before the heating. From the point of view of inhibiting the resulting expanded polyolefin resin particles from varying in expansion ratio, it is preferable that the foaming agents be also introduced during the foaming.

A more specific example of a process for producing expanded polyolefin resin particles includes the following steps.

After polyolefin resin particles, an aqueous dispersion medium and, as needed, a dispersant and the like are fed into a closed vessel and a vacuum is created, as needed, in the closed vessel, carbon dioxide is introduced at approximately not lower than 1 MPa to not higher than 2 MPa (gage pressure) and the temperature is raised up to or above the softening temperature of the polyolefin resin. The heating causes the internal pressure of the closed vessel to increase to approximately not lower than approximately 1.5 MPa to not higher than 5 MPa (gage pressure). After carbon dioxide is further added at a temperature close to the foaming temperature so that a desired foaming pressure is attained and a temperature adjustment is further made, the release into a zone whose pressure is lower than the internal pressure of the closed vessel is carried out. In this way, the expanded polyolefin resin particles are obtained.

Alternatively, after polyolefin resin particles, an aqueous dispersion medium and, as needed, a dispersant and the like are fed into a closed vessel and a vacuum is created, as needed, in the closed vessel, carbon dioxide may be introduced while raising the temperature up to or above the softening temperature of the polyolefin resin.

Alternatively, the expanded polyolefin resin particles are obtained by feeding polyolefin resin particles, an aqueous dispersion medium and, as needed, a dispersant and the like into a closed vessel, raising the temperature up to a temperature close to the foaming temperature, introducing air, nitrogen, or the like, attaining the foaming temperature, and carrying out the release into a zone whose pressure is lower than the internal pressure of the closed vessel.

There are no particular limitations on the closed vessel into which the polyolefin resin particles are dispersed, as long as it can withstand its internal pressure and temperature during production of the expanded particles, and examples of the closed vessel include autoclave pressure-resistant containers.

It is preferable that the aqueous dispersion medium be water. The aqueous dispersion medium may also be a dispersion medium obtained by adding methanol, ethanol, ethylene glycol, glycerin, or the like to water.

It is preferable to use a dispersant to prevent the polypropylene resin particles from being closely united with each other in the aqueous dispersion medium. Examples of the dispersant include inorganic dispersants such as tertiary calcium phosphate, tertiary magnesium phosphate, basic magnesium carbonate, calcium carbonate, barium sulfate, kaolin, talc, and clay.

Further, it is preferable to use a dispersion auxiliary agent together with the dispersant. Examples of the dispersion auxiliary agent include: anionic surfactants of the carboxylate type such as N-acylamino-acid salt, alkyl ether carboxylate, and acyl peptide; anionic surfactants of the sulfonate type such as alkyl sulfonate, alkyl benzene sulfonate, alkyl naphthalene sulfonate, and sulfosuccinate; anionic surfactants of the sulfuric ester type such as sulfated oil, alkyl sulfate, alkyl ether sulfate, and alkyl amide sulfate; and anionic surfactants of the phosphoric ester type such as alkyl phosphate, polyoxyethylene phosphate, and alkyl aryl ether phosphate. It is also possible to use: polymer surfactants of the polycarboxylic acid type such as a salt of a maleic acid copolymer and polyacrylate; and polyanionic polymer surfactants such as polyethylene sulfonate and a salt of a naphthalene sulfonate formalin condensate.

It is preferable that the dispersion auxiliary agent be an anionic surfactant of the sulfonate type, more preferably one type selected from alkyl sulfonate and alkyl benzene sulfonate or a mixture of two or more types; even more preferably alkyl sulfonate, or especially preferably alkyl sulfonate having a C10 to C18 straight carbon chain as a hydrophobic group, which can reduce adhesion of the dispersant to the expanded polyolefin resin particles.

Among them, it is preferable to concomitantly use, as the dispersant, one or more type selected from tertiary calcium phosphate, tertiary magnesium phosphate, barium sulfate, and kaolin, and to concomitantly use alkyl sulfonate as the dispersion auxiliary agent.

The amounts of the dispersant and the dispersion auxiliary agent that are used vary according to their types and the type and amount of the polyolefin resin that is used. Usually, it is preferable to blend the dispersant and the dispersion auxiliary agent in not less than 0.2 parts by weight to not more than 3 parts by weight and in not less than 0.001 part by weight to not more than 0.1 part by weight, respectively, to 100 parts by weight of the aqueous dispersion medium. Further, it is preferable to use the polyolefin resin particles in not less than 20 parts by weight to not more than 100 parts by weight to 100 parts by weight of the aqueous dispersion medium so that the dispersibility of the polyolefin resin particles in the aqueous dispersion medium is satisfactory.

It is preferable that the expanded polyolefin resin particles thus obtained of the present invention contain not less than 0.05% by weight to not more than 2% by weight of the polyethylene glycol or the polyvalent alcohol having a carbon number of not less than 3 to not more than 6 and three or more hydroxyl groups, or not less than 0.01% by weight to not more than 5% by weight of the water-absorbing compound having no function of forming foaming nuclei.

It is preferable that the expanded polyolefin resin particles thus produced of the present invention have a melt index of not less than 1 g/10 minutes to not more than 12 g/10 minutes, more preferably not less than 3 g/10 minutes to not more than 11 g/10 minutes, or most preferably not less than 4 g/10 minutes to not more than 10 g/10 minutes. If the expanded polyolefin resin particles have a melt index of less than 1 g/10 minutes, degradation in secondary expandability leads to degradation in moldability during in-mold expansion molding. On the other hand, if the expanded polyolefin resin particles have a melt index of more than 12 g/10 minutes, the expanded particles become higher in open cell ratio, e.g., to suffer from cell breakage.

It should be noted here that when the expanded polyolefin resin particles are expanded polypropylene resin particles, the melt index of the expanded polyolefin resin particles in the present invention is a value measured at a temperature of 230° C. with a load of 2.16 kg in conformity to JIS K7210; and when the expanded polyolefin resin particles are expanded polyethylene resin particles, the melt index of the expanded polyolefin resin particles in the present invention is a value measured at a temperature of 190° C. with a load of 2.16 kg in conformity to JIS K7210. In either case, the value is measured after defoaming the expanded polyolefin resin particles by pressing and turning them into a sheet at 190° C. under 10 MPa and then crushing the sheet into pieces of suitable size.

According to the process of the present invention for producing expanded polyolefin resin particles, the melt index of expanded polyethylene resin particles tends to be smaller than the melt index of the base resin, polyethylene resin, and the difference is less than approximately 3 g/10 minutes. Selection of a melt index of the polyethylene resin with this point in view makes it possible to obtain the expanded polyethylene resin particles of the present invention.

On the other hand, the melt index of expanded polypropylene resin particles tends to be larger than the melt index of the base resin, polypropylene resin, and the difference is less than approximately 3 g/10 minutes. Selection of a melt index of the polypropylene resin with this point in view makes it possible to obtain the expanded polypropylene resin particles of the present invention.

There are no particular limitations on the expansion ratio of the expanded polyolefin resin particles, and it is possible to produce the expanded particles having an expansion ratio of more than 1 time to less than 3 times. However, it is preferable that the expansion ratio be not less than 3 times, more preferably not less than 8 times, or even more preferably not less than 10 times. Further, it is preferable that the upper limit of the expansion ratio be not more than 50 times, more preferably not more than 45 times, or even more preferably not more than 25 times.

If the expansion ratio is less than 3 times, the merit of being light in weight cannot be attained, and the resulting in-mold expanded molded product tends to be insufficient in flexibility and buffering properties. If the expansion ratio is more than 50 times, the resulting in-mold expanded molded product tends to be insufficient in dimensional accuracy, mechanical strength, heat resistance, and the like.

If the expansion ratio is not less than 3 times, the cell diameter and the expansion ratio tend to be able to be adjusted satisfactorily by concomitant use of the foam nucleating agent with the polyethylene glycol, the polyvalent alcohol having a carbon number of not less than 3 to not more than 6 and three or more hydroxyl groups, or the water-absorbing compound having no function of forming foaming nuclei. On the other hand, if the expansion ratio is not more than 50 times, an in-mold expanded molded product obtained by in-mold expansion molding tends to be sufficient in dimensional accuracy, mechanical strength, heat resistance, and the like, without breakage of cells in the expanded polypropylene resin particles.

In order to obtain expanded polyolefin resin particles having an expansion ratio of not less than 20 times, it is possible to attain an expansion ratio of not less than 20 times in the step of releasing the polyolefin resin particles into the zone whose pressure is lower than the internal pressure of the closed vessel (this step being referred to sometimes as "first-stage foaming"). However, it is preferable to produce expanded polyolefin resin particles with an expansion ratio of less than 20 times by first-stage foaming, to pressurize the expanded polyolefin resin particles with an inorganic gas such as air in a closed vessel to impart internal pressure, and to increase the expansion ratio to 20 times or higher by further expanding the expanded polyolefin resin particles (referred to sometimes as "second-stage foaming") by steam heating.

It is preferable that the expanded polyolefin resin particles of the present invention have an average cell diameter of not less than 50 μm to not more than 800 μm, more preferably not less than 130 μm to not more than 500 μm, or most preferably not less than 210 μm to not more than 350 μm. If the average cell diameter is less than 50 μm, there may occur such problems as distortion in the shape of the resulting in-mold expanded molded product and generation of wrinkles on a surface of the product. If the average cell diameter is more than 800 μm, there may be degradation in buffering properties of the resulting in-mold expanded molded product.

It is preferable that the expanded polyolefin resin particles of the present invention have an open cell ratio of not less than 0% to not more than 12%, more preferably not less than 0% to not more than 8%, or even more preferably not less than 0% to not more than 5%. If the open cell ratio is more than 12%, there occurs deterioration in the expandability of the expanded polyolefin resin particles during in-mold steam heating when the expanded polyolefin resin particles are subjected to in-mold expansion molding, and the resultant in-mold expanded molded product has large holes and therefore tends to shrink.

It is preferable that the expanded polyolefin resin particles of the present invention have a moisture content of not lower than 0.1% to not higher than 10%, more preferably not lower than 0.7% to not higher than 8%, or even more preferably not lower than 1% to not higher than 5%. If the moisture content is lower than 0.1%, the resulting expanded polyolefin resin particles may only have a low expansion ratio. If the moisture content is higher than 10%, the internal pressure of the expanded polyolefin resin particles after foaming is so low that they are likely to shrink and may remain shrunk even when cured in an oven after foaming.

It is preferable that the expanded polyolefin resin particles of the present invention have two melting peaks on a DSC curve that is obtained by differential scanning calorimetry as shown in FIG. 1.

Those expanded particles which have two melting peaks tend to have such good in-mold expansion moldability as to give an in-mold expanded molded product satisfactory in mechanical strength and heat resistance.

It should be noted here that the DSC curve that is obtained by differential scanning calorimetry of the expanded polyolefin resin particles means a DSC curve that is obtained by raising the temperature of not less than 1 mg to not more than 10 mg of expanded particles from 40° C. to 220° C. at a heating rate of 10° C./min in differential scanning calorimetry.

Such expanded polyolefin resin particles having two melting peaks are easily obtained by setting the temperature in the closed vessel during foaming to an appropriate value. That is, in the case of the present invention, the temperature in the closed vessel is usually not lower than the softening temperature of the polyolefin resin, which serves as a base material, preferably not lower than the melting point, more preferably not lower than a temperature of 5° C. plus the melting point to lower than the temperature at which the melting ends, even more preferably not higher than a temperature of 2° C. minus the temperature at which the melting ends. In such a case, expanded polyolefin resin particles having two melting peaks tend to be obtained.

It should be noted that the term "temperature at which the melting ends" means a temperature at which the base of a melting peak of a DSC curve that is obtained by raising the temperature of not less than 1 mg to not more than 10 mg of polyolefin resin from 40° C. to 220° C. at a heating rate of 10° C./min in differential scanning calorimetry, lowering the temperature to 40° C. at a heating rate of 10° C./min, and then again raising the temperature to 220° C. at a heating rate of 10° C./min returns to the position of the baseline on the high-temperature side.

Further, it is preferable that the quantity of heat at the endothermic peak on the higher-temperature side among the two melting peaks (such a quantity of heat being hereinafter denoted sometimes by "Qh") be not less than 5 J/g to not more than 30 J/g, or more preferably not less than 7 J/g to not more than 20 J/g. If the quantity of heat Qh is less than 5 J/g, the expanded polyolefin resin particles tend to have a higher open cell ratio. If the quantity of heat Qh is more than 30 J/g, there tends to be degradation in fusibility with which an in-mold expanded molded product is obtained. See FIG. 1 for the quantity of heat Qh on the high-temperature side. A is the point at which the smallest quantity of heat absorption is reached between the two melting peaks of the DSC curve. Qh is the quantity of heat at the melting peak on the higher-temperature side, which is the right one of the two areas (shaded in FIG. 1) surrounded by the DSC curve and tangents to the DSC curve drawn from the point A, and Ql is the quantity of heat at the melting peak on the lower-temperature side, which is the left one of the two shaded areas.

It is preferable that the expanded polyolefin resin particles that are obtained by the present invention have a cell diameter variation of less than 0.4, more preferably not more than 0.3, or even more preferably not more than 0.2. If the cell diameter variation is not less than 0.4, the resulting in-mold expanded molded product deteriorates in surface properties and therefore tends to show noticeable wrinkles and gaps such as dents and holes between expanded particles (between particles).

Such a cell diameter variation can be attained by using the polyethylene glycol, the polyvalent alcohol having a carbon number of not less than 3 to not more than 6 and three or more hydroxyl groups, or the water-absorbing compound having no function of forming foaming nuclei and the foam nucleating agent in the present invention or, more preferably can be easily attained by concomitantly using carbon dioxide as a foaming agent. The reason for this is uncertain, but there presumed to be some effect of the interaction of carbon dioxide with the polyethylene glycol, the polyvalent alcohol having a carbon number of not less than 3 to not more than 6 and three or more hydroxyl groups, or the water-absorbing compound having no function of forming foaming nuclei.

It is preferable that the expanded polyolefin resin particles of the present invention have a volatile content of not lower than 0.1% by weight to not higher than 10% by weight, or more preferably not lower than 1% by weight to not higher than 8% by weight. If the volatile content is lower than 0.1% by weight, the desired expansion ratio mentioned later cannot be attained. If the volatile content is higher than 10% by weight, the resulting expanded polyolefin resin particles shrink and therefore tend to have wrinkles generated on their surfaces.

Such a volatile content is believed to be composed mainly of water contained in the expanded polyolefin resin particles or carbon dioxide.

For example, in terms of improving the expansion ratio or from the point of view of in-mold expansion mold ability, a preferred aspect of the volatile content and average cell diameter of expanded polyolefin resin particles produced by the process of the present invention for producing expanded polyolefin resin particles is as follows:

The volatile content and average cell diameter of expanded polyolefin resin particles (referred to as "expanded polyolefin resin particles (P)") that are obtained by a production process of the present invention and the volatile content and average cell diameter of expanded polyolefin resin particles (referred to as "expanded polyolefin resin particles (Q)") produced under the same conditions except that the water-absorbing substance having no function of forming foaming nuclei is not contained satisfy the following formulas (E1) and (E2): (E1): Volatile Content of Expanded Polyolefin Resin Particles (P)≥Volatile Content of Expanded Polyolefin Resin Particles (Q)×1.1; and (E2) Average Cell Diameter of Expanded Polyolefin Resin Particles (P)≥Average Cell Diameter of Expanded Polyolefin Resin Particles (Q)×0.7. If the volatile content of the expanded polyolefin resin particles (P) is less than the volatile content of expanded polyolefin resin particles (Q)×1.1, there tends to be degradation in foaming power during foaming, with the result that the desired expansion ratio may not be attained.

Further, if the average cell diameter of the expanded polyolefin resin particles (P) is less than the average cell diameter of the expanded polyolefin resin particles (Q)×0.7, the decrease in the average cell diameter may lead to degradation in fusibility during in-mold expansion molding. It should be noted that the average cell diameter in this case is an average cell diameter L(av) measured according to a method mentioned later.

EXAMPLES

In the following, the present invention is described more specifically with reference to Examples and Comparative Examples; however, the present invention is not limited solely to these Examples.

It should be noted that evaluations in Examples, Comparative Examples, and References were carried out according to the following methods.

(Expansion Ratio)

Approximately not less than 3 g to not more than 10 g of expanded particles were taken to be dried at 60° C. for six hours, and then the weight w was measured. After that, the expanded particles were submerged in water contained in a measuring cylinder, and then the absolute specific gravity ρb=w/v of the expanded particles was calculated by measuring the volume v (cm³) according to the surface elevation, and the expansion ratio K=ρr/ρb was calculated from the ratio of the density ρr (=0.9 g/cm³) of the raw material composition to the absolute specific gravity ρb.

(Open Cell Ratio)

The open cell ratio was calculated by: calculating the closed-cell volume of the resultant expanded particles using an air comparison pycnometer (Type 1000; manufactured by Tokyoscience Co., Ltd.); calculating the percentage of closed cells (%) by dividing the closed-cell volume by the apparent volume separately calculated by submergence; and subtracting the percentage of closed cells from 100.

(Moisture Content)

Expanded particles immediately after foaming with use of only water as a foaming agent were used. The expanded particles were dehydrated by using the flow of air to blow away moisture from the surfaces of the particles. After that, the weight (W1) of the expanded particles was measured. Furthermore, the weight (W2) of the expanded particles as dried for twelve hours in an oven at 80° C. was measured. The moisture content was computed as:

Moisture Content(%)=(W1−W2)/W2×100.

In the case of concomitant use of a foaming agent other than water, the moisture content of expanded particles just obtained by separate foaming at the same foaming temperature and the same foaming pressure as in the case of use of only water as a foaming agent was computed through the above-mentioned operation.

(Volatile Content)

Expanded particles immediately after foaming were used. The expanded particles were dehydrated by using the flow of air to blow away moisture from the surfaces of the particles. After that, the weight (w1) of the expanded particles was measured. Furthermore, the weight (w2) of the expanded particles as dried for twelve hours in an oven at 80° C. was measured. The volatile content was computed as:

Volatile Content(%)=(w1−w2)/w2×100.

(Average Cell Diameter d)

In the present invention, two types of average cell diameter were measured: one was the average cell diameter d, and the other was the average cell diameter L(av) mentioned later. However, the average cell diameter d and the average cell diameter L(av) were roughly equal to each other. The average cell diameter d was determined as below.

Each expanded particle was cut substantially in the middle with sufficient care to prevent the destruction of a cell membrane, and a cross-section of each expanded particle was magnified and observed with a microscope. Let it be assumed that the x direction is a given direction of that portion (H) of each expanded particle excluding the surface part whose length is five percent of the diameter of the expanded particle and the y direction is a direction orthogonal to the x direction. Then, the Feret's diameters of each cell along the x and y directions were measured as dx and dy, respectively, and the diameter di of that one cell was calculated as di=(dx+dy)/(2×0.785). Such measurements were performed on forty or more consecutively adjacent cells in such a way that there was no radial bias in the portion (H), and the average of the measurements was given as: Average Cell Diameter d=Σ(di)/n, where n is the number of cells measured.

(Uniformity U of Cells)

Uniformity of cells was measured by using both the uniformity U of cells and the cell diameter variation S as indices. The uniformity U of cells was determined as below.

The standard deviation σ of variations in the diameter of the forty or more cells as measured in determining the average cell diameter d was computed, and the uniformity u of cells in a single expanded particle was computed as u=σ/d×100.

Such measurements were performed on three or more expanded particles, and the average of the measurements was obtained as the uniformity U of cells, which was evaluated as follows:

Very good: U is 30 or less
Good: U is more than 30 and 35 or less
Poor: U is greater than 35

(Average Cell Diameter L(av))

Twenty randomly chosen expanded particles were cut substantially in the middle, and each of the cross-sections thus exposed was observed with a microscope. It should be noted here that the center O is the point of orthogonal intersection between an X axis and a Y axis substantially in the center of the cross-section, A and A' are the points at which the X axis intersects with the edge of the cross-section, and B and B' are the points at which the Y axis intersects with the edge of the cross-section.

Next, the cell diameter L(OA) was calculated by: counting the number of cell walls crossed by the segment OA, obtaining a quotient by dividing the length of the segment OA by the number of cell walls, and further dividing the quotient by 0.616. That is, the cell diameter L(OA) was calculated from Eq. (1) as follows:

[Math. 1]

$$L(OA) = \text{Length of Segment } OA/\text{Number of Cell Walls}/0.616 \quad \text{Eq. (1)}.$$

The cell diameters L(OA'), L(OB), and L(OB') were calculated in the same way based on the segments OA', OB, and OB', respectively. It should be noted that a cell wall on which the center O was located was counted.

The average cell diameter L(av) was obtained by computing the average L'(av) of the four cell diameters L(OA), L(OA'), L(OB), and L(OB') and further averaging the respective averages L'(av) of the twenty expanded polyolefin resin particles.

(Cell Diameter Variation S)

In the measurement of the average cell diameter L(av), the cell diameter variation (S') of each single expanded particle was computed from Eq. (2) as follows:

[Math. 2]

$$S' = \Sigma\{(L(i) - L'(av))/L'(av)\}^2 \quad \text{Eq. (2)},$$

where i=OA, OA', OB, OB'.

The cell diameter variation S was obtained by averaging the respective cell diameter variations S' of the twenty expanded particles.

(Shrinkage and Wrinkles on Expanded Particles)

Evaluations were carried out as follows:

Good: Expanded particles have no wrinkle on their surfaces and therefore are good in appearance Poor: Expanded particles are shrunken to have many wrinkles on their surfaces (Second-Stage Expandability)

Expanded particles obtained by two-stage foaming were observed with eyes and evaluated as follows:

Good: There are no expanded particles agglomerated to each other

Average: There are a few expanded particles sticking to each other

Poor: A high vapor pressure is required; therefore, there are many expanded particles agglomerated to each other (Surface Properties of Molded Products)

The surface properties of each molded product obtained by leaving it at rest for two hour at 23° C. after in-mold expansion molding, curing it for six hour at 65° C., and leaving it in a room for four hours at 23° C. were evaluated by the following criteria:

Very good: No wrinkles, no gaps between particles (no dents or holes between expanded particles), or no surface sinks; good in appearance Good: Slight wrinkles, slight gaps between particles; but no surface sinks (with no practical problem)

Average: Slight wrinkles, slight gaps between particles, and slight surface sinks (with no practical problem)

Poor: Noticeable wrinkles, gaps between particles, and surface sinks; defective in appearance (Rate of Dimensional Shrinkage of Molded Products)

The longitudinal dimensions of each molded product obtained by leaving it at rest for two hour at 23° C. after in-mold expansion molding, curing it for six hour at 65° C., and leaving it in a room for four hours at 23° C. were measured. The ratio of difference of the dimensions of the in-mold expanded molded product to those of the corresponding mold was obtained as a rate of dimensional shrinkage with respect to the mold, which was evaluated by the criteria below. It should be noted that such a mold was used for molding that the design dimensions of a molded product were 400 mm×300 mm×20 mm.

Very good: The rate of dimensional shrinkage with respect to the mold is 4% or lower Good: The rate of dimensional shrinkage with respect to the mold is higher than 4% and 7% or lower Average: The rate of dimensional shrinkage with respect to the mold is higher than 7% and 9% or lower Poor: The rate of dimensional shrinkage with respect to the mold is higher than 9%

(Rate of Fusion of Molded Products)

Each molded product was cracked with a knife approximately 5 mm deep on the surface. The in-mold expanded molded product was split along the crack. The fracture surface was observed. The ratio of the number of broken particles to the total number of particles observed was obtained. Evaluations were based on the following criteria:

Very good: The rate of fusion is 80% or higher

Good: The rate of fusion is 65% or higher and lower than 80%

Average: The rate of fusion is 50% or higher and lower than 65%

Poor: The rate of fusion is lower than 50%

Example 1

Polyethylene glycol (having an average molecular weight of 300; manufactured by Lion Corporation) was pre-blended in 0.5 parts by weight to 100 parts by weight of polypropylene resin A (propylene-ethylene random copolymer: ethylene content of 3.0%, MI=6 g/10 minutes, melting point of 143° C.). In addition, talc (manufactured as Talcan Powder PK-S by Hayashi-Kasei Co., Ltd.) was blended as a foam nucleating agent in 0.05 parts by weight. The mixture was supplied to a single screw extruder 50 in diameter, melted and kneaded, extruded through a cylindrical die 1.8 mm in diameter, cooled with water, and then cut with a cutter to give cylinder-shaped polypropylene resin particles (1.2 mg/particle).

Into a pressure-resistant closed vessel, 100 parts by weight of the polypropylene resin particles thus obtained were fed together with 200 parts by weight of pure water, 1.0 part by weight of tertiary calcium phosphate, and 0.05 parts by weight of soda dodecylbenzenesulfonate. After deairing, and while stirring, 6 parts by weight of carbon dioxide were put into the closed vessel, which was then heated to 148° C. The internal pressure of the pressure-resistant closed vessel at this point in time was 3 MPa (gage pressure). Shortly after that, the water dispersion (the resin particles and the aqueous dispersion medium) was released into a zone under atmospheric pressure through an orifice 4 mm in diameter by opening a valve installed in the lower part of the closed vessel, thus giving expanded particles (first-stage expanded particles). During the release, the internal pressure of the vessel was retained by carbon dioxide so as not to decrease.

The first-stage expanded particles thus obtained showed two melting points of 138° C. and 157° C. in differential scanning calorimetry. As a result of the measurement of the expansion ratio, the open cell ratio, and the average cell diameter, the first-stage expanded particles were found to have an expansion ratio of 19 times and an open cell ratio of 0.6%, to be excellent in uniformity of cells, and to have an average cell diameter d of 340 μm. The moisture content was measured by water foaming with the internal temperature of the closed vessel set at 148° C. as above, and was found to be 3.3%.

The first-stage expanded particles thus obtained were subjected to second-stage foaming by drying them for six hour at 60° C., setting the internal pressure at approximately 0.4 MPa (absolute pressure) through impregnating them with pressurized air in the closed vessel, and bringing them into contact with vapor of approximately 0.08 MPa (gage pressure), thus giving second-stage expanded particles having an expansion ratio of 30 times. The second-stage expanded particles showed two melting points in differential scanning calorimetry, had an open cell ratio of 1.3%, and were excellent in uniformity of cells an average cell diameter d of 435 μm. As a result of the microscopic observation of the surfaces of the expanded particles subjected to the second-stage foaming, the expanded particles were found to be uniform in diameter of cells in the surfaces, to have smooth surfaces, and to be small in number of thin parts of the surface membranes thereof. Next, the expanded particles subjected to the second-stage foaming were subjected to in-mold expansion molding after setting the internal air pressure at approximately 0.19 MPa (absolute pressure) through again pressuring them with air in the closed vessel. The in-mold expanded molded product thus obtained had a surface excellent in smoothness and free of wrinkles, was small in dimensional shrinkage, had less distortion, was excellent in fusion between particles, and therefore was good in appearance. The results are shown in Table 1.

TABLE 1

| | | Examples | | | | | | |
| --- | --- | --- | --- | --- | --- | --- | --- | --- |
| | | 1 | 2 | 3 | 4 | 5 | 6 | 7 |
| Polypropylene resin A | (Parts by weight) | 100 | 100 | 100 | 100 | 100 | 100 | 100 |
| Linear low-density polyethylene resin | (Parts by weight) | | | | | | | |

TABLE 1-continued

| | | 1 | 2 | 3 | 4 | 5 | 6 | 7 |
|---|---|---|---|---|---|---|---|---|
| Polyethylene glycol (avg. molecular wt.: 300) | (Parts by weight) | 0.5 | 0.2 | 0.1 | | 0.05 | 0.5 | |
| Polyethylene glycol (avg. molecular wt.: 600) | (Parts by weight) | | | | | | | 0.5 |
| Polyethylene glycol (avg. molecular wt.: 6,000) | (Parts by weight) | | | | | 1.0 | | |
| Cross-linked polyalkylene oxide | (Parts by weight) | | | | | | | |
| Sodium polyacrylate | (Parts by weight) | | | | | | | |
| Carboxymethylcellulose sodium | (Parts by weight) | | | | | | | |
| Zeolite | (Parts by weight) | | | | | | | |
| Polypropylene glycol (avg. molecular wt.: 2,000) | (Parts by weight) | | | | | | | |
| Talc | (Parts by weight) | 0.05 | 0.1 | 0.05 | 0.1 | 0.05 | 0.1 | 0.1 |
| Percentage of moisture content | (%) | 3.3 | 2.0 | 1.3 | 2.2 | 0.7 | 3.3 | 3.0 |
| Amount of $CO_2$ | (Parts by weight) | 6 | 6 | 6 | 6 | 3 | 0 | 0 |
| First-stage expanded particles — Expansion ratio | (Times) | 19 | 15 | 11 | 12 | 6 | 12 | 10 |
| First-stage expanded particles — Average cell diameter d | (μm) | 340 | 270 | 275 | 260 | 200 | 235 | 225 |
| First-stage expanded particles — Uniformity of cells | | Very Good | Very Good | Very Good | Good | Good | Good | Good |
| Second-stage expandability | | Good | Good | Good | Good | Good | Good | Good |
| Molded Product — Surface properties | | Very good | Very good | Very good | Good | Very good | Good | Good |
| Molded Product — Rate of dimensional shrinkage | | Very good | Very good | Very good | Good | Very good | Good | Good |
| Molded Product — Rate of fusion | | Very good | Very good | Very good | Good | Very good | Very good | Very good |

| | | Examples | | | | | Comp. Examples | |
|---|---|---|---|---|---|---|---|---|
| | | 8 | 9 | 10 | 11 | 12 | 1 | 2 |
| Polypropylene resin A | (Parts by weight) | 100 | 100 | 100 | 100 | | 100 | 100 |
| Linear low-density polyethylene resin | (Parts by weight) | | | | | 100 | | |
| Polyethylene glycol (avg. molecular wt.: 300) | (Parts by weight) | | | | | | 0.5 | |
| Polyethylene glycol (avg. molecular wt.: 600) | (Parts by weight) | | | | | | | |
| Polyethylene glycol (avg. molecular wt.: 6,000) | (Parts by weight) | | | | | | | |
| Cross-linked polyalkylene oxide | (Parts by weight) | 1.0 | | | | | | |
| Sodium polyacrylate | (Parts by weight) | | 0.5 | | | | | |
| Carboxymethylcellulose sodium | (Parts by weight) | | | 0.3 | | | | |
| Zeolite | (Parts by weight) | | | | | | | 1.0 |
| Polypropylene glycol (avg. molecular wt.: 2,000) | (Parts by weight) | | | | | 0.2 | | |
| Talc | (Parts by weight) | 0.05 | 0.05 | 0.1 | 0.1 | 0.1 | 0.05 | 0 |
| Percentage of moisture content | (%) | 2.3 | 2.8 | 3.5 | 0.7 | 2.4 | 0.4 | 4.0 |
| Amount of $CO_2$ | (Parts by weight) | 6 | 6 | 6 | 6 | 12 | 6 | 6 |
| First-stage expanded particles — Expansion ratio | (Times) | 11 | 17 | 18 | 9 | 5 | 6 | 13 |
| First-stage expanded particles — Average cell diameter d | (μm) | 320 | 380 | 300 | 160 | 160 | 150 | 225 |
| First-stage expanded particles — Uniformity of cells | | Good | Average | Average | Good | Good | Good | Poor |
| Second-stage expandability | | Good | Good | Good | Average | Good | Poor | Average |
| Molded Product — Surface properties | | Good | Average | Average | Average | Good | Poor | Poor |
| Molded Product — Rate of dimensional shrinkage | | Average | Average | Average | Average | Good | Poor | Poor |
| Molded Product — Rate of fusion | | Average | Average | Very good | Average | Very good | Very good | Average |

Example 2

Foaming, second-stage foaming, and in-mold expansion molding were carried out in the same way as in Example 1, except that the additive, polyethylene glycol (having an average molecular weight of 300), and talc were used in 0.2 parts by weight and 0.1 part by weight, respectively. The first-stage expanded particles showed two melting points, had an expansion ratio of 15 times and an open cell ratio of 0.7%, were excellent in uniformity of cells, and had an average cell diameter d of 270 μm. The moisture content was 2.0%. Next, second-stage expanded particles having an expansion ratio of 30 times were obtained in the same way as in Example 1. The second-stage expanded particles showed two melting points in differential scanning calorimetry, had an open cell ratio of 0.8%, and were excellent in uniformity of cells with an average cell diameter d of 375 μm. As a result of the evaluation of in-mold expansion molding, the in-mold expanded molded product thus obtained was found to have a surface excellent in smoothness and free of wrinkles, to be small in dimensional shrinkage, to have less distortion, to be excellent in fusion between particles, and to be therefore good in appearance. The results are shown in Table 1.

Example 3

Foaming, second-stage foaming, and in-mold expansion molding were carried out in the same way as in Example 1, except that the additive, polyethylene glycol (having an average molecular weight of 300), was used in 0.1 part by weight. The first-stage expanded particles obtained by the first-stage foaming showed two melting points, had an expansion ratio of 11 times and an open cell ratio of 0.7%, were excellent in uniformity of cells, and had an average cell diameter d of 275 μm. The moisture content was 1.3%. Next, second-stage expanded particles having an expansion ratio of 30 times were obtained in the same way as in Example 1. The second-stage expanded particles showed two melting points in differential scanning calorimetry, had an open cell ratio of 0.8%, and were excellent in uniformity of cells with an average cell diameter d of 420 μm. As a result of the evaluation of in-mold expansion molding, the in-mold expanded molded product thus obtained was found to have a surface excellent in smoothness and free of wrinkles, to be small in dimensional shrinkage, to have less distortion, to be excellent in fusion between particles, and to be therefore good in appearance. The results are shown in Table 1.

Example 4

Foaming, second-stage foaming, and in-mold expansion molding were carried out in the same way as in Example 1, except that the additive, polyethylene glycol (having an average molecular weight of 6,000), and talc were used in 1.0 part by weight and 0.1 part by weight, respectively. The first-stage expanded particles obtained by the first-stage foaming showed two melting points and had an expansion ratio of 12 times, an open cell ratio of 1.3%, and an average cell diameter d of 260 μm. The cells were slightly inferior in uniformity to those of Examples 1 to 3, but were substantially uniform. Further, the moisture content was 2.2%. Next, second-stage expanded particles having an expansion ratio of 30 times were obtained in the same way as in Example 1. The second-stage expanded particles showed two melting points in differential scanning calorimetry, had an open cell ratio of 2.0%, and were satisfactory in uniformity of cells with an average cell diameter d of 390 μm. As a result of the evaluation of in-mold expansion molding, the in-mold expanded molded product thus obtained was found to have a surface excellent in smoothness, albeit with slight wrinkles and gaps between particles, to be comparatively small in dimensional shrinkage, to have less distortion, and to be therefore good in appearance. As for the fusion between particles, there were slightly more unfused particles than in Examples 1 to 3. The results are shown in Table 1.

Example 5

Foaming, second-stage foaming, and in-mold expansion molding were carried out in the same way as in Example 1, except that the additive, polyethylene glycol (having an average molecular weight of 300), and carbon dioxide were used in 0.05 parts by weight and 3 parts by weight, respectively. The first-stage expanded particles obtained by the first-stage foaming showed two melting points and had an expansion ratio of 6 times, an open cell ratio of 0.7%, and an average cell diameter d of 200 μm. The cells were slightly inferior in uniformity to those of Examples 1 to 3, but were substantially uniform. Further, the moisture content was 0.7%. Next, second-stage expanded particles having an expansion ratio of 30 times were obtained in the same way as in Example 1. The second-stage expanded particles showed two melting points in differential scanning calorimetry, had an open cell ratio of 0.8%, and were satisfactory in uniformity of cells with an average cell diameter d of 330 μm. As a result of the evaluation of in-mold expansion molding, the in-mold expanded molded product thus obtained was found to have a surface excellent in smoothness and free of wrinkles, to be small in dimensional shrinkage, to have less distortion, to be excellent in fusion between particles, and to be therefore good in appearance. The results are shown in Table 1.

Example 6

The additive, polyethylene glycol (having an average molecular weight of 300), was used in 0.5 parts by weight, and talc was used in 0.1 part by weight. The foaming agent, carbon dioxide, was not used, but nitrogen gas was introduced instead. The temperature was raised to 151° C. Further, during the release of the water dispersion (the resin particles and the aqueous dispersion medium) into a zone under atmospheric pressure through an orifice 4 mm in diameter, the internal pressure of the vessel was retained by nitrogen gas so as not to decrease. As for the rest, first-stage foaming, second-stage foaming, and the evaluation of in-mold expansion molding were carried out in the same way as in Example 1. The internal pressure of the closed vessel during the first-stage foaming was 3.0 MPa (gage pressure). The first-stage expanded particles obtained by the first-stage foaming showed two melting points and had an expansion ratio of 12 times, an open cell ratio of 1.1%, and an average cell diameter d of 235 μm. The cells were slightly inferior in uniformity to those of Examples 1 to 3, but were substantially uniform. The moisture content was 3.3%. Next, second-stage expanded particles having an expansion ratio of 30 times were obtained in the same way as in Example 1. The second-stage expanded particles showed two melting points in differential scanning calorimetry, had an open cell ratio of 2.3%, and were satisfactory in uniformity of cells with an average cell diameter d of 355 μm. As a result of the evaluation of in-mold expansion molding, the in-mold expanded molded product thus obtained was found to have a surface excellent in smoothness, albeit with slight wrinkles and gaps between particles, to be comparatively small in dimensional shrinkage, to have less distortion, to be excellent in fusion between particles, and to be therefore good in appearance. The results are shown in Table 1.

Example 7

First-stage foaming, second-stage foaming, and the evaluation of in-mold expansion molding were carried out in the same way as in Example 6, except that the additive, polyethylene glycol (having an average molecular weight of 600), was used in 0.5 parts by weight. The first-stage expanded particles obtained by the first-stage foaming showed two melting points and had an expansion ratio of 10 times, an open cell ratio of 1.2%, and an average cell diameter d of 225 μm. The cells were slightly inferior in uniformity to those of Examples 1 to 3, but were substantially uniform. The moisture content was 3.0%. Next, second-stage expanded particles having an expansion ratio of 30 times were obtained in the same way as in Example 1. The second-stage expanded particles showed two melting points in differential scanning calorimetry, had an open cell ratio of 2.5%, and were satisfactory in uniformity of cells with an average cell diameter d of 345 μm. As a result of the evaluation of in-mold expansion molding, the in-mold expanded molded product thus obtained was found to have a surface excellent in smoothness, albeit with slight wrinkles and gaps between particles, to be comparatively small in dimensional shrinkage, to have less distortion, to be excellent in fusion between particles, and to be therefore good in appearance. The results are shown in Table 1.

Example 8

First-stage foaming, second-stage foaming, and in-mold expansion molding were carried out in the same way as in Example 1, except that cross-linked polyalkylene oxide was used in 1.0 part by weight instead of polyethylene glycol. The cells in the first-stage expanded particles were substantially uniform. The first-stage expanded particles were processed into second-stage expanded particles, which were then used to give an in-mold expanded molded product. The in-mold expanded molded product was slightly inferior in surface properties, slightly higher in rate of dimensional shrinkage, slightly lower in fusion between particles in comparison with those obtained with use of polyethylene glycol. The results are shown in Table 1.

Example 9

First-stage foaming, second-stage foaming, and in-mold expansion molding were carried out in the same way as in Example 1, except that sodium polyacrylate was used in 0.5 parts by weight instead of polyethylene glycol. The cells in the first-stage expanded particles were slightly nonuniform. The first-stage expanded particles were processed into second-stage expanded particles, which were then used to give an in-mold expanded molded product. The in-mold expanded molded product was slightly inferior in surface properties, slightly higher in rate of dimensional shrinkage, and slightly lower in fusion between particles in comparison with those obtained with use of polyethylene glycol. The results are shown in Table 1.

Example 10

First-stage foaming, second-stage foaming, and in-mold expansion molding were carried out in the same way as in Example 1, except that carboxymethylcellulose sodium was used as an additive in 0.3 parts by weight instead of polyethylene glycol and talc was used in 0.1 part by weight. The cells in the first-stage expanded particles were slightly nonuniform. The first-stage expanded particles were processed into second-stage expanded particles, which were then used to give an in-mold expanded molded product. The in-mold expanded molded product was slightly inferior in surface properties and slightly higher in rate of dimensional shrinkage in comparison with those obtained with use of polyethylene glycol, but was satisfactory in fusion between particles. The results are shown in Table 1.

Example 11

First-stage foaming, second-stage foaming, and in-mold expansion molding were carried out in the same way as in Example 1, except that polypropylene glycol (having an average molecular weight of 2,000) was used in 0.2 parts by weight instead of polyethylene glycol and talc was used in 0.1 part by weight. The cells in the first-stage expanded particles were slightly nonuniform, and a few of the particles agglomerated to each other during the second-stage foaming. Further, the second-stage expanded particles were used to give an in-mold expanded molded product. The in-mold expanded molded product was slightly inferior in surface properties, slightly higher in rate of dimensional shrinkage, and slightly lower in fusion between particles in comparison with those obtained with use of polyethylene glycol. The results are shown in Table 1.

Example 12

Polyethylene glycol (having an average molecular weight of 300; manufactured by Lion Corporation) was pre-blended in 0.5 parts by weight to 100 parts by weight of a linear low-density polyethylene resin (MI=2.0 g/10 minutes, melting point of 122° C.). In addition, talc (manufactured as Talcan Powder PK-S by Hayashi-Kasei Co., Ltd.) was blended as a foam nucleating agent in 0.1 part by weight. The mixture was supplied to a single screw extruder 50 in diameter, melted and kneaded, extruded through a cylindrical die 1.8 mm in diameter, cooled with water, and then cut with a cutter to give cylinder-shaped linear low-density polyethylene resin particles (1.2 mg/particle).

Into a pressure-resistant closed vessel, 100 parts by weight of the cylinder-shaped linear low-density polyethylene resin particles thus obtained were fed together with 200 parts by weight of pure water, 1.0 part by weight of tertiary calcium phosphate, and 0.05 parts by weight of soda dodecylbenzenesulfonate. After deairing, and while stirring, 12 parts by weight of carbon dioxide were put into the closed vessel, which was then heated to 123° C. The internal pressure of the pressure-resistant closed vessel at this point in time was 4.5 MPa (gage pressure). Shortly after that, the water dispersion (the resin particles and the aqueous dispersion medium) was released into a zone under atmospheric pressure through an orifice 3.6 mm in diameter by opening a valve installed in the lower part of the closed vessel, thus giving expanded particles (first-stage expanded particles). During the release, the internal pressure of the vessel was retained by carbon dioxide so as not to decrease.

The first-stage expanded particles thus obtained showed two melting points of 117° C. and 128° C. in differential scanning calorimetry. As a result of the measurement of the expansion ratio, the open cell ratio, and the average cell diameter, the first-stage expanded particles were found to have an expansion ratio of 5 times and an open cell ratio of 0.6%, to be excellent in uniformity of cells, and to have an average cell diameter d of 160 p.m. The moisture content was measured by water foaming with the internal temperature of the closed vessel set at 123° C. as above, and was found to be 2.4%.

The first-stage expanded particles thus obtained were subjected to second-stage foaming by drying them for six hour at 60° C., setting the internal pressure at approximately 0.4 MPa (absolute pressure) through impregnating them with pressurized air in the closed vessel, and bringing them into contact with vapor of approximately 0.03 MPa (gage pressure), thus giving second-stage expanded particles having an expansion ratio of 20 times. The second-stage expanded particles showed two melting points in differential scanning calorimetry, had an open cell ratio of 1.3%, and were excellent in uniformity of cells with an average cell diameter d of 270 μm. As a result of the microscopic observation of the surfaces of the expanded particles subjected to the second-stage foaming, the expanded particles were found to be uniform in diameter of cells in the surfaces, to have smooth surfaces, and to be small in number of thin parts of the surface membranes thereof. Next, the expanded particles subjected to the second-stage foaming were subjected to in-mold expansion molding. The in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 1.

Comparative Example 1

Foaming was carried out in the same way as in Example 1 under the conditions shown in the table, without use of polyethylene glycol. The expansion ratio thus attained was as low as 6 times, and the average cell diameter was also as small as 150 μM. Further, in comparison with the case of use of polyethylene glycol, a higher vapor pressure was required in the second-stage foaming for an expansion ratio of 30 times; therefore, many of the expanded particles agglomerated to each other. Such second-stage expanded particles were subjected to in-mold expansion molding to give an in-mold expanded molded product. The in-mold expanded molded product was poor in surface properties, high in rate of dimensional shrinkage, and inferior in appearance. The results are shown in Table 1.

Comparative Example 2

First-stage foaming, second-stage foaming, and in-mold expansion molding were carried out in the same way as in Example 1, except that zeolite A was used in 1.0 part by weight instead of polyethylene glycol and talc was not used. The cells in the first-stage expanded particles were inferior in uniformity because some cells were coarse and others were small. A few of the particles agglomerated to each other during the second-stage foaming, and a high vapor pressure was required for an expansion ratio of 30 times; therefore, a few of the expanded particles agglomerated to each other. Such second-stage expanded particles were used to give an in-mold expanded molded product. The in-mold expanded molded product was poor in surface properties and large in dimensional shrinkage. The results are shown in Table 1.

Example 13

Glycerin (purified glycerin D; manufactured by Lion Corporation) was pre-blended in 0.1 part by weight to 100 parts by weight of polypropylene resin A (propylene-ethylene random copolymer: ethylene content of 3.0%, MI=6 g/10 minutes, melting point of 143° C.). In addition, talc (manufactured as Talcan Powder PK-S by Hayashi-Kasei Co., Ltd.) was blended as a foam nucleating agent in 0.1 part by weight. The mixture was supplied to an extruder, melted and kneaded, extruded through a cylindrical die 1.8 mm in diameter, cooled with water, and then cut with a cutter to give cylinder-shaped polyolefin resin particles (1.2 mg/particle).

Into a pressure-resistant closed vessel, 100 parts by weight of the polyolefin resin particles thus obtained were fed together with 200 parts by weight of pure water, 1.0 part by weight of tertiary calcium phosphate, and 0.05 parts by weight of soda dodecylbenzenesulfonate. After deairing, and while stirring, 6 parts by weight of carbon dioxide were put into the closed vessel, which was then heated to 148° C. The internal pressure of the pressure-resistant closed vessel at this point in time was 3 MPa (gage pressure). Shortly after that, the water dispersion (the resin particles and the aqueous dispersion medium) was released into a zone under atmospheric pressure through an orifice 4 mm in diameter by opening a valve installed in the lower part of the closed vessel, thus giving expanded particles (first-stage expanded particles). During the release, the internal pressure of the vessel was retained by carbon dioxide so as not to decrease.

The first-stage expanded particles thus obtained showed two melting points of 138° C. and 157° C. in differential scanning calorimetry. As a result of the measurement of the expansion ratio, the open cell ratio, and the average cell diameter, the first-stage expanded particles were found to have an expansion ratio of 15 times and an open cell ratio of 0.9%, to be excellent in uniformity of cells, and to have an average cell diameter d of 239 μm. The moisture content was measured by water foaming with the internal temperature of the closed vessel set at 148° C. as above, and was found to be 1.8%.

The first-stage expanded particles thus obtained were subjected to second-stage foaming by drying them for six hour at 60° C., setting the internal pressure at approximately 0.4 MPa (absolute pressure) through impregnating them with pressurized air in the closed vessel, and bringing them into contact with vapor of approximately 0.08 MPa (gage pressure), thus giving second-stage expanded particles having an expansion ratio of 30 times. The second-stage expanded particles showed two melting points in differential scanning calorimetry, had an open cell ratio of 1.4%, and were excellent in uniformity of cells with an average cell diameter d of 300 μm. Next, the expanded particles subjected to the second-stage foaming were subjected to in-mold expansion molding after setting the internal air pressure at approximately 0.19 MPa (absolute pressure) through again pressuring them with air in the closed vessel. The in-mold expanded molded product thus obtained had a surface excellent in smoothness, albeit with slight wrinkles and gaps between particles, was comparatively low in rate of dimensional shrinkage, had less distortion, was excellent in fusion between particles, and therefore was good in appearance. The results are shown in Table 2.

TABLE 2

|  |  | Examples | | | | | | | | | |
| --- | --- | --- | --- | --- | --- | --- | --- | --- | --- | --- | --- |
|  |  | 13 | 14 | 15 | 16 | 17 | 18 | 19 | 20 | 21 | 22 |
| Polypropylene resin A | Parts by weight | 100 | 100 | 100 | 100 | 100 | 100 | 100 | 100 | 100 |  |
| Linear low-density polyethylene resin | Parts by weight |  |  |  |  |  |  |  |  |  | 100 |
| Glycerin | Parts by weight | 0.1 | 0.15 | 0.2 | 0.05 | 0.2 | 0.2 |  | 0.2 |  | 0.2 |

TABLE 2-continued

| | | Examples | | | | | | | | | |
|---|---|---|---|---|---|---|---|---|---|---|---|
| | | 13 | 14 | 15 | 16 | 17 | 18 | 19 | 20 | 21 | 22 |
| Diglycerin | Parts by weight | | | | | | | 0.2 | | | |
| Polyethylene glycol (avg. molecular wt.: 300) | Parts by weight | | | | | 0.1 | | | | | |
| Melamine | Parts by weight | | | | | | 0.05 | | | | |
| Polyethylene glycol dimethyl ether | Parts by weight | | | | | | | | | 0.5 | |
| Cross-linked polyalkylene oxide | Parts by weight | | | | | | | | | | |
| Sodium polyacrylate | Parts by weight | | | | | | | | | | |
| Carboxymethylcellulose sodium | Parts by weight | | | | | | | | | | |
| Zeolite | Parts by weight | | | | | | | | | | |
| Polypropylene glycol | Parts by weight | | | | | | | | | | |
| Talc | Parts by weight | 0.1 | 0.05 | 0.02 | 0.05 | 0.05 | 0.02 | 0.05 | 0.02 | 0.1 | 0.1 |
| Percentage of moisture content | % | 1.8 | 2.4 | 2.9 | 0.9 | 3.3 | 3.3 | 2.0 | 2.9 | 0.4 | 2.4 |
| Amount of $CO_2$ | Parts by weight | 6 | 6 | 6 | 3 | 6 | 6 | 6 | 0 | 6 | 12 |
| First-stage expanded particles — Expansion ratio | Times | 15 | 18 | 17 | 7 | 17 | 16 | 15 | 13 | 7 | 6 |
| First-stage expanded particles — Average cell diameter d | μm | 239 | 250 | 271 | 210 | 304 | 260 | 250 | 190 | 250 | 170 |
| First-stage expanded particles — Uniformity of cells | | Very good | Very good | Good | Good | Very good | Good | Good | Good | Good | Good |
| Second-stage expandability | | Good | Good | Good | Good | Good | Good | Good | Good | Average | Good |
| Molded Product — Surface properties | | Good | Good | Very good | Good | Very good | Good | Good | Good | Average | Good |
| Molded Product — Rate of dimensional shrinkage | | Good | Very good | Very good | Good | Very good | Good | Good | Good | Average | Good |
| Molded Product — Rate of fusion | % | Very good | Very good | Very good | Very good | Very good | Very good | Very good | Very good | Good | Very good |

Example 14

Foaming, second-stage foaming, and in-mold expansion molding were carried out in the same way as in Example 13, except that the additive, glycerin, and talc were used in 0.15 parts by weight and 0.05 parts by weight, respectively. The first-stage expanded particles showed two melting points, had an expansion ratio of 18 times and an open cell ratio of 1.2%, were excellent in uniformity of cells, and had an average cell diameter d of 250 μm. The moisture content was 2.4%. Next, second-stage expanded particles having an expansion ratio of 30 times were obtained in the same way as in Example 13. The second-stage expanded particles showed two melting points in differential scanning calorimetry, had an open cell ratio of 1.3%, and were excellent in uniformity of cells with an average cell diameter d of 290 μm. As a result of the in-mold expansion molding, the in-mold expanded molded product thus obtained had a surface excellent in smoothness, albeit with slight wrinkles and gaps between particles, was small in dimensional shrinkage, to have less distortion, was excellent in fusion between particles, and therefore was good in appearance. The results are shown in Table 2.

Example 15

Foaming, second-stage foaming, and in-mold expansion molding were carried out in the same way as in Example 13, except that the additive, glycerin, and talc were used in 0.2 parts by weight and 0.02 parts by weight, respectively. The first-stage expanded particles obtained by the first-stage foaming showed two melting points, had an expansion ratio of 17 times, an open cell ratio of 0.7%, and an average cell diameter d of 271 μm. The cells were slightly inferior in uniformity to those of Example 13, but were substantially uniform. The moisture content was 2.9%. Next, second-stage expanded particles having an expansion ratio of 30 times were obtained in the same way as in Example 13. The second-stage expanded particles showed two melting points in differential scanning calorimetry, had an open cell ratio of 1.0%, and were satisfactory in uniformity of cells with an average cell diameter d of 330 μm. As a result of the in-mold expansion molding, the in-mold expanded molded product thus obtained had a surface excellent in smoothness and free of wrinkles, was small in dimensional shrinkage, had less distortion, was excellent in fusion between particles, and therefore was good in appearance. The results are shown in Table 2.

Example 16

Foaming, second-stage foaming, and in-mold expansion molding were carried out in the same way as in Example 13, except that glycerin, talc, and carbon dioxide were used in 0.05 parts by weight, 0.05 parts by weight, and 3 parts by weight, respectively. The first-stage expanded particles obtained by the first-stage foaming showed two melting points, had an expansion ratio of 7 times, an open cell ratio of 0.7%, and an average cell diameter d of 210 μm. The cells were slightly inferior in uniformity to those of Example 13, but were substantially uniform. The moisture content was 0.9%. Next, second-stage expanded particles having an expansion ratio of 30 times were obtained in the same way as in Example 13. The second-stage expanded particles showed two melting points in differential scanning calorimetry, had an open cell ratio of 1.0%, and were satisfactory in uniformity of cells with an average cell diameter d of 280 μm. As a result of the in-mold expansion molding, the in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 2.

Example 17

Foaming, second-stage foaming, and in-mold expansion molding were carried out in the same way as in Example 13, except that polyethylene glycol (having an average molecular weight of 300; manufactured by Lion Corporation) and talc were used in 0.1 part by weight and 0.05 parts by weight, respectively, in addition to the additive, glycerin, used in 0.2 parts by weight. The first-stage expanded particles obtained by the first-stage foaming showed two melting points, had an expansion ratio of 17 times, an open cell ratio of 1.1%, and an average cell diameter d of 304 μm. The cells were particularly superior in uniformity to those of Examples 13 to 15. The moisture content was 3.3%. Next, second-stage expanded particles having an expansion ratio of 30 times were obtained in the same way as in Example 13. The second-stage expanded particles showed two melting points in differential scanning calorimetry, had an open cell ratio of 1.5%, and were excellent in uniformity of cells with an average cell diameter d of 365 μm. As a result of the in-mold expansion molding, the in-mold expanded molded product thus obtained had a surface excellent in smoothness and free of wrinkles, was small in dimensional shrinkage, had less distortion, was excellent in fusion between particles, and therefore was good in appearance. The results are shown in Table 2.

Example 18

Foaming, second-stage foaming, and in-mold expansion molding were carried out in the same way as in Example 13, except that melamine (pulverized melamine; manufactured by Nissan Chemical Industries, Ltd.) and talc were used in 0.05 parts by weight and 0.02 parts by weight, respectively, in addition to the additive, glycerin, used in 0.2 parts by weight. The first-stage expanded particles obtained by the first-stage foaming showed two melting points, had an expansion ratio of 16 times, an open cell ratio of 1.0%, and an average cell diameter d of 260 μm. The cells were slightly inferior in uniformity to those of Example 13, but were substantially uniform. The moisture content was 3.3%. Next, second-stage expanded particles having an expansion ratio of 30 times were obtained in the same way as in Example 13. The second-stage expanded particles, showed two melting points in differential scanning calorimetry, had an open cell ratio of 1.5%, and were excellent in uniformity of cells with an average cell diameter d of 320 μm. As a result of the in-mold expansion molding, the in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 2.

Example 19

Foaming, second-stage foaming, and in-mold expansion molding were carried out in the same way as in Example 13, except that diglycerin was used as an additive in 0.2 parts by weight and talc was used in 0.05 parts by weight. The first-stage expanded particles obtained by the first-stage foaming showed two melting points, had an expansion ratio of 15 times, an open cell ratio of 1.4%, and an average cell diameter d of 250 μm. The cells were slightly inferior in uniformity to those of Example 13, but were substantially uniform. The moisture content was 2.0%. Next, second-stage expanded particles having an expansion ratio of 30 times were obtained in the same way as in Example 13. The second-stage expanded particles showed two melting points in differential scanning calorimetry, had an open cell ratio of 1.5%, and were excellent in uniformity of cells with an average cell diameter d of 305 μm. As a result of the in-mold expansion molding, the in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 2.

Example 20

The additive, glycerin, was used in 0.2 parts by weight, and talc was used in 0.02 part by weight. The foaming agent, carbon dioxide, was not used, but nitrogen gas was introduced instead. The temperature was raised to 151° C. As for the rest, first-stage foaming, second-stage foaming, and the evaluation of in-mold expansion molding were carried out in the same way as in Example 13. The internal pressure of the closed vessel during the first-stage foaming was 3.0 MPa (gage pressure). The first-stage expanded particles obtained by the first-stage foaming showed two melting points and had an expansion ratio of 13 times, an open cell ratio of 1.5%, and an average cell diameter d of 190 μm. The cells were slightly inferior in uniformity to those of Example 13, but were substantially uniform. The moisture content was 2.9%. Next, second-stage expanded particles having an expansion ratio of 30 times were obtained in the same way as in Example 13. The second-stage expanded particles showed two melting points in differential scanning calorimetry, had an open cell ratio of 2.3%, and were excellent in uniformity of cells with an average cell diameter d of 250 μm. As a result of the in-mold expansion molding, the in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 2.

Example 21

First-stage foaming, second-stage foaming, and in-mold expansion molding were carried out in the same way as in Example 13, except that polyethylene glycol dimethyl ether was used in 0.5 parts by weight instead of glycerin and talc was used in 0.1 part by weight. The first-stage expanded particles had a low expansion ratio of 7 times. The cells were slightly inferior in uniformity to those of Example 13, but were substantially uniform. A few of the particles agglomerated to each other during the second-stage foaming. Such second-stage expanded particles were subjected to the in-mold expansion molding to give an in-mold expanded molded product. The in-mold expanded molded product was slightly inferior in surface properties and slightly higher in rate of dimensional shrinkage in comparison with that of Example 13, in which glycerin was used. The in-mold expanded molded product was satisfactory in fusion between particles, but there were slightly more unfused particles than in Example 13. The results are shown in Table 2.

References below describe a method for determining whether or not an additive is a water-absorbing substance of the present invention having no function of forming foaming nuclei.

Example 22

Glycerin (purified glycerin D; manufactured by Lion Corporation) was pre-blended in 0.2 parts by weight to 100 parts by weight of a linear low-density polyethylene resin (MI=2.0 g/10 minutes, melting point of 122° C.). In addition, talc (manufactured as Talcan Powder PK-S by Hayashi-Kasei Co., Ltd.) was blended as a foam nucleating agent in 0.1 part by weight. The mixture was supplied to a single screw extruder 50 in diameter, melted and kneaded, extruded through a cylindrical die 1.8 mm in diameter, cooled with water, and then cut with a cutter to give cylinder-shaped linear low-density polyethylene resin particles (1.2 mg/particle).

Into a pressure-resistant closed vessel, 100 parts by weight of the cylinder-shaped linear low-density polyethylene resin particles thus obtained were fed together with 200 parts by weight of pure water, 1.0 part by weight of tertiary calcium phosphate, and 0.05 parts by weight of soda dodecylbenzenesulfonate. After deairing, and while stirring, 12 parts by weight of carbon dioxide were put into the closed vessel, which was then heated to 123° C. The internal pressure of the pressure-resistant closed vessel at this point in time was 4.5 MPa (gage pressure). Shortly after that, the water dispersion (the resin particles and the aqueous dispersion medium) was released into a zone under atmospheric pressure through an orifice 3.6 mm in diameter by opening a valve installed in the lower part of the closed vessel, thus giving expanded particles (first-stage expanded particles). During the release, the internal pressure of the vessel was retained by carbon dioxide so as not to decrease.

The first-stage expanded particles thus obtained showed two melting points of 117° C. and 128° C. in differential scanning calorimetry. As a result of the measurement of the expansion ratio, the open cell ratio, and the average cell diameter, the first-stage expanded particles were found to have an expansion ratio of 6 times and an open cell ratio of 0.6%, to be excellent in uniformity of cells, and to have an average cell diameter d of 160 µm. The moisture content was measured by water foaming with the internal temperature of the closed vessel set at 123° C. as above, and was found to be 2.4%.

The first-stage expanded particles thus obtained were subjected to second-stage foaming by drying them for six hour at 60° C., setting the internal pressure at approximately 0.4 MPa (absolute pressure) through impregnating them with pressurized air in the closed vessel, and bringing them into contact with vapor of approximately 0.03 MPa (gage pressure), thus giving second-stage expanded particles having an expansion ratio of 20 times. The second-stage expanded particles showed two melting points in differential scanning calorimetry, had an open cell ratio of 1.3%, and were excellent in uniformity of cells with an average cell diameter d of 270 µm. As a result of the microscopic observation of the surfaces of the expanded particles subjected to second-stage foaming, the expanded particles were found to be uniform in diameter of cells in the surfaces, to have smooth surfaces, and to be small in number of thin parts of the surface membranes thereof. Next, the expanded particles subjected to the second-stage foaming were subjected to in-mold expansion molding. The in-mold expanded molded product thus obtained had a surface excellent in smoothness, albeit with slight wrinkles and gaps between particles, was comparatively small in dimensional shrinkage, had less distortion, was excellent in fusion between particles, and therefore was good in appearance. The results are shown in Table 2.

Reference 1

Polypropylene resin B (propylene/ethylene/butene-1 random copolymer: ethylene content of 2.6% by weight, butene-1 content of 1.4% by weight, melt index of 7 g/10 minutes, melting point of 145° C.) was supplied to a single screw extruder 50 in diameter, melted and kneaded at 200° C., extruded through a cylindrical die 1.8 mm in diameter, cooled with water, and then cut with a cutter to give cylinder-shaped polypropylene resin particles (1.2 mg/particle).

Into a pressure-resistant closed vessel, 100 parts by weight of the cylinder-shaped polypropylene resin particles thus obtained were fed together with 300 parts by weight of pure water, 1.0 part by weight of tertiary calcium phosphate, and 0.05 parts by weight of soda dodecylbenzenesulfonate. After deairing, and while stirring, 14 parts by weight of carbon dioxide were put into the closed vessel, which was then heated to 149° C. The internal pressure of the closed vessel at this point in time was 3 MPa (gage pressure). Shortly after that, the water dispersion containing polypropylene resin particles and the aqueous dispersion medium was released into a zone under atmospheric pressure through an orifice 4 mm in diameter by opening a valve installed in the lower part of the closed vessel, thus giving expanded polypropylene resin particles. During the release, the internal pressure of the vessel was retained by carbon dioxide so as not to decrease.

The additive-free expanded polypropylene resin particles thus obtained had an average cell diameter L(av) of 260 µm.

Reference 2

Polyethylene glycol (having an average molecular weight of 300; manufactured by Lion Corporation) was pre-blended as an additive D in 0.5 parts by weight to 100 parts by weight of polypropylene resin B. The mixture was supplied to a single screw extruder 50 in diameter, melted and kneaded at 200° C., extruded through a cylindrical die 1.8 mm in diameter, cooled with water, and then cut with a cutter to give cylinder-shaped polyethylene glycol-containing polypropylene resin particles (1.2 mg/particle).

After that, expanded polyethylene glycol-containing polypropylene resin particles were produced in just the same way as in Reference 1. The average cell diameter L(av) of the expanded particles thus obtained is shown in Table 3. A comparison with Reference 1 shows that polyethylene glycol is a water-absorbing substance of the present invention having no function of forming foaming nuclei.

TABLE 3

| References | Codes | Additives Types | Melting point (° C.) | Avg. cell diameter L(av) | Water-absorbing substance having no function of forming foaming nuclei |
|---|---|---|---|---|---|
| 1 | N/A | N/A | N/A | 260 | N/A |
| 2 | D | Polyethylene glycol (avg. molecular wt.: 300) | −13 | 230 | Yes |
| 3 | E | Block copolymer containing a polyolefin block and a polyethylene oxide block (Pelestat 303) | 135 | 200 | Yes |
| 4 | F | Sodium Polyacrylate | Decomposed before melting | 300 | Yes |
| 5 | G | Carboxymethylcellulose sodium | No melting point | 210 | Yes |
| 6 | H | Polyvinyl alcohol | 150-230 | 200 | Yes |
| 7 | I | Bentonite | 1,000 or higher | 260 | Yes |
| 8 | J | Synthetic hectolite | (300 or higher) | 290 | Yes |
| 9 | K | Synthetic zeolite | (300 or higher) | 190 | Yes |
| 10 | L | Zinc borate | 980 | 140 | No |

* N/A means "not applicable."

Reference 3

Expanded polypropylene resin particles were produced in just the same way as in Reference 2, except that a block copolymer having a polyolefin block and a polyethylene oxide block (Pelestat 303; manufactured by Sanyo Chemical Industries, Ltd.) was used as an additive E instead of the additive D, polyethylene glycol. The average cell diameter L(av) of the expanded particles thus obtained is shown in Table 3. A comparison with Reference 1 shows that the block copolymer having a polyolefin block and a polyethylene oxide block is a water-absorbing substance of the present invention having no function of forming foaming nuclei.

References 4 to 9

Expanded polypropylene resin particles were produced in just the same way as in Reference 2, except that each of the following additives F to K was used instead of the additive D, polyethylene glycol. The percentage of volatile content and average cell diameter L(av) of the expanded particles thus obtained are shown in Table 3. It is shown that each of the additives is a water-absorbing substance of the present invention having no function of forming foaming nuclei.

Additives

F: Sodium polyacrylate (AQUA KEEP 10SH-NF; manufactured by Sumitomo Seika Chemicals Co., Ltd.)

G: Carboxymethylcellulose sodium (MAC20; manufacture by Nippon Paper Chemicals Co., Ltd.)

H: Polyvinyl alcohol (PVA205S; manufactured by Kuraray Co., Ltd.)

I: Bentonite (Bengel Bright 25; manufactured by Hojun)

J: Synthetic hectolite (Laponite RD; manufactured by Toshin Chemicals Co., Ltd.)

K: Synthetic zeolite (NX-100P; manufactured by Nippon Chemical Industrial Co., Ltd.)

Reference 10

Expanded polypropylene resin particles were produced in just the same way as in Reference 3, except that zinc borate (zinc borate 2335; manufactured by Tomita Pharmaceuticals Co., Ltd.) was used as an additive L instead of the additive D, polyethylene glycol. The average cell diameter L(av) of the expanded particles is shown in Table 3. It is shown that this additive is not a water-absorbing substance of the present invention having no function of forming foaming nuclei.

Example 23

The additive D (polyethylene glycol having an average molecular weight of 300; manufactured by Lion Corporation) was pre-blended in 0.5 parts by weight to 100 parts by weight of polypropylene resin (propylene/ethylene/butene-1 random copolymer: ethylene content of 2.6% by weight, butene-1 content of 1.4% by weight, melt index of 7 g/10 minutes, melting point of 145° C.). In addition, talc (manufactured as Talcan Powder PK-S by Hayashi-Kasei Co., Ltd.) was blended as a foam nucleating agent in 0.03 part by weight. The mixture was supplied to a single screw extruder 50 in diameter, melted and kneaded with a temperature of 200° C. at the tip of the die, extruded through a cylindrical die 1.8 mm in diameter, cooled with water, and then cut with a cutter to give cylinder-shaped polypropylene resin particles (1.2 mg/particle).

Into a pressure-resistant closed vessel, 100 parts by weight of the cylinder-shaped polypropylene resin particles thus obtained were fed together with 300 parts by weight of pure water, 2.0 parts by weight of tertiary calcium phosphate, and 0.05 parts by weight of soda dodecylbenzenesulfonate. After deairing, and while stirring, 14 parts by weight of carbon dioxide were put into the closed vessel, which was then heated to 149° C. The internal pressure of the closed vessel at this point in time was 2.9 MPa (gage pressure). Furthermore, the internal temperature of the closed vessel was set at 3.3 MPa (gage pressure) by adding carbon dioxide gases, and retained for 10 minutes. After that, water dispersion (the resin particles and the aqueous dispersion medium) was released into a zone under atmospheric pressure through an orifice 4 mm in diameter by opening a valve installed in the lower part of the closed vessel, thus giving expanded polypropylene resin particles (first-stage expanded particles). During the release, the internal pressure of the vessel was retained by carbon dioxide so as not to decrease during the release.

The first-stage expanded particles thus obtained showed two endothermic peaks at approximately 142° C. and approximately 159° C. in differential scanning calorimetry. As a result of the measurement of the expansion ratio, the open cell ratio, and the average cell diameter L(av), the first-stage expanded particles were found, as shown in Table 4, to have an expansion ratio of 15 times, an open cell ratio of 0.6%, a percentage of volatile content of 3.0%, and an average cell diameter L(av) of 270 µm. The first-stage expanded particles had a small cell diameter variation S of 0.07 and therefore were excellent in uniformity in cell diameter.

The first-stage expanded particles thus obtained were subjected to second-stage foaming by cleansing them with acid, drying them for six hour at 60° C., setting the internal pressure at approximately 0.4 MPa (absolute pressure) through impregnating them with pressurized air in the closed vessel, and bringing them into contact with vapor of approximately 0.07 MPa (gage pressure), thus giving second-stage expanded particles having an expansion ratio of 30 times. As a result of the microscopic observation of the surfaces of the expanded particles subjected to the second-stage foaming, the expanded particles were found to be uniform in diameter of cells in the surfaces, to have smooth surfaces, and to be small in number of thin parts of the surface membranes thereof. Next, the expanded particles subjected to the second-stage foaming were subjected to in-mold expansion molding after setting the internal air pressure at approximately 0.2 MPa (absolute pressure) through again pressuring them with air in the closed vessel. The in-mold expanded molded product thus obtained had a surface excellent in smoothness and free of wrinkles, was small in dimensional shrinkage, had less distortion, was excellent in fusion between particles, and therefore was good in appearance. The results are shown in Table 4.

were subjected to the in-mold expansion molding to give an in-mold expanded molded product. The in-mold expanded molded product thus obtained had a surface excellent in smoothness and free of wrinkles, was small in dimensional shrinkage, had less distortion, was excellent in fusion between particles, and therefore was good in appearance. The results are shown in Table 4.

Examples 25 to 30

First-stage expanded particles were obtained in the same way as in Example 23, except that each of the additives F, G, H, J, and K was used instead of the additive D, polyethylene glycol, in an amount shown in Table 4, that the foam nucleating agent, talc, was used in an amount shown in Table 4, and that the second-stage foaming conditions were as shown in Table 4. Next, second-stage expanded particles having an expansion ratio of 30 times were obtained and subjected to in-mold expansion molding. The first-stage expanded particles thus obtained showed two endothermic peaks at

TABLE 4

| | | Examples | | | | | | | | | | |
|---|---|---|---|---|---|---|---|---|---|---|---|---|
| | | 23 | 24 | 25 | 26 | 27 | 28 | 29 | 30 | 31 | 32 | 33 |
| Polyropylene resin | | B | B | B | B | B | B | B | B | C | C | C |
| Type of additives | | D | D | F | F | G | H | J | K | D | E | I |
| Amount of additives | Parts by weight | 0.5 | 0.5 | 0.2 | 0.5 | 0.5 | 0.5 | 1.0 | 1.0 | 0.5 | 1.0 | 1.0 |
| Talc | Parts by weight | 0.03 | 0.30 | 0.05 | 0.05 | 0.03 | 0.03 | 0.03 | 0.03 | 0.05 | 0.05 | 0.01 |
| Initial amount of $CO_2$ | Parts by weight | 14 | 14 | 14 | 14 | 14 | 14 | 14 | 14 | 6 | 6 | 6 |
| Expansion ratio | Times | 15 | 17 | 11 | 18 | 11 | 11 | 13 | 12 | 19 | 12 | 14 |
| Open cell ratio | % | 0.6 | 0.7 | 1.0 | 1.5 | 1.7 | 0.6 | 1.8 | 1.7 | 0.6 | 0.9 | 1.1 |
| Percentage of volatile content | % | 3.0 | 3.0 | 2.2 | 3.6 | 5.8 | 2.9 | 2.9 | 4.3 | 3.1 | 1.8 | 6.0 |
| Avg. cell diameter L(av) | μm | 270 | 230 | 310 | 410 | 280 | 240 | 280 | 280 | 350 | 350 | 290 |
| Cell diameter variation S | | 0.07 | 0.05 | 0.2 | 0.4 | 0.4 | 0.2 | 0.15 | 0.1 | 0.05 | 0.05 | 0.4 |
| Shrinkage and wrinkles in expanded particles | | Good | Good | Good | Good | Good | Good | Good | Good | Good | Good | Good |
| Internal pressure during second-stage foaming | MPa (absolute pressure) | approx. 0.4 | approx. 0.4 | approx. 0.4 | approx. 0.4 | approx. 0.4 | approx. 0.4 | approx. 0.4 | approx. 0.4 | approx. 0.4 | approx. 0.4 | approx. 0.4 |
| Vapor pressure during second-stage foamng | MPa (gage pressure) | approx. 0.07 | approx. 0.07 | approx. 0.08 | approx. 0.07 | approx. 0.08 | approx. 0.08 | approx. 0.08 | approx. 0.08 | approx. 0.06 | approx. 0.08 | approx. 0.07 |
| Second-stage expandability | | Good | Good | Good | Good | Good | Good | Good | Good | Good | Good | Good |
| Surface properties of molded product | | Very good | Very good | Very good | Good | Good | Very good | Very good | Very good | Very good | Very good | Good |
| Rate of fusion of molded product | | Very good | Very good | Very good | Good | Good | Very good | Very good | Good | Very good | Very good | Very good |

Example 24

First-stage expanded particles were obtained in the same way as in Example 23, except that the foam nucleating agent, talc, was used in 0.3 parts by weight and the second-stage foaming conditions were as shown in Table 4. Next, second-stage expanded particles having an expansion ratio of 30 times were obtained and subjected to in-mold expansion molding. The first-stage expanded particles thus obtained showed two endothermic peaks at approximately 142° C. and approximately 159° C. in differential scanning calorimetry, and the expansion ratio, the open cell ratio, the average cell diameter L(av), and the cell diameter variation S were as shown in Table 4. As a result of the microscopic observation of the surfaces of the expanded particles subjected to the second-stage foaming, the expanded particles were found to be uniform in diameter of cells in the surfaces, to have smooth surfaces, and to be small in number of thin parts of the surface membranes thereof. The second-stage expanded particles were subjected to the in-mold expansion molding to give an in-mold expanded molded product. The in-mold expanded molded product thus obtained had a surface excellent in smoothness and free of wrinkles, was small in dimensional shrinkage, had less distortion, was excellent in fusion between particles, and therefore was good in appearance. However, in Examples 26 and 27, the in-mold expanded molded products showed slight wrinkles and gaps between particles on their surfaces. The in-mold expanded molded products were satisfactory in fusion between particles, but there were slightly more unfused particles. Also, in Example 30, the in-mold expanded molded product was satisfactory in fusion between particles, but there were slightly more unfused particles.

Example 31

The additive D (polyethylene glycol having an average molecular weight of 300; manufactured by Lion Corporation) was pre-blended in 0.5 parts by weight to 100 parts by weight of polypropylene resin C (propylene/ethylene random copolymer: ethylene content of 3.2% by weight, melt index of 6 g/10 minutes, melting point of 142° C.). In addition, talc (manufactured as Talcan Powder PK-S by Hayashi-Kasei Co., Ltd.) was blended as a foam nucleating agent in 0.05 part by weight. The mixture was supplied to a single screw extruder 50 in diameter, melted and kneaded with a temperature of 200° C. at the tip of the die, extruded through a cylindrical die 1.8 mm in diameter, cooled with water, and then cut with a cutter to give cylinder-shaped polyolefin resin particles (1.2 mg/particle).

Into a pressure-resistant closed vessel, 100 parts by weight of the polypropylene resin particles thus obtained were fed together with 200 parts by weight of pure water, 2.0 part by weight of tertiary calcium phosphate, and 0.05 parts by weight of soda dodecylbenzenesulfonate. After deairing, and while stirring, 6 parts by weight of carbon dioxide were put into the closed vessel, which was then heated to 148° C. The internal pressure of the closed vessel at this point in time was 2.8 MPa (gage pressure). Furthermore, the internal temperature of the closed vessel was set at 3.0 MPa (gage pressure) by adding carbon dioxide gasses, and retained for ten minutes. After that, the water dispersion containing polypropylene resin particles and the aqueous dispersion medium was released into a zone under atmospheric pressure through an orifice 4 mm in diameter by opening a valve installed in the lower part of the closed vessel, thus giving expanded polypropylene resin particles (first-stage expanded particles). During the release, the internal pressure of the vessel was retained by carbon dioxide so as not to decrease.

The first-stage expanded particles thus obtained showed two endothermic peaks at approximately 138° C. and approximately 157° C. in differential scanning calorimetry. As a result of the measurement of the expansion ratio, the open cell ratio, and the average cell diameter L(av), the first-stage expanded particles were found, as shown in Table 4, to have an expansion ratio of 19 times, an open cell ratio of 0.6%, a percentage of volatile content of 3.1%, and an average cell diameter L(av) of 350 μm. The first-stage expanded particles had a small cell diameter variation S of 0.05 and therefore were excellent in uniformity in cell diameter.

The first-stage expanded particles thus obtained were subjected to second-stage foaming by cleansing them with acid, drying them for six hour at 60° C., setting the internal pressure at approximately 0.4 MPa (absolute pressure) through impregnating them with pressurized air in the closed vessel, and bringing them into contact with vapor of approximately 0.06 MPa (gage pressure), thus giving second-stage expanded particles having an expansion ratio of 30 times. As a result of the microscopic observation of the surfaces of the expanded particles subjected to second-stage foaming, the expanded particles were found to be uniform in diameter of cells in the surfaces, to have smooth surfaces, and to be small in number of thin parts of the surface membranes thereof. Next, the expanded particles subjected to the second-stage foaming were subjected to in-mold expansion molding after setting the internal air pressure at approximately 0.2 MPa (absolute pressure) through again pressuring them with air in the closed vessel. The in-mold expanded molded product thus obtained had a surface excellent in smoothness and free of wrinkles, was small in dimensional shrinkage, had less distortion, was excellent in fusion between particles, and therefore was good in appearance. The results are shown in Table 4.

Examples 32 and 33

First-stage expanded particles were obtained in the same way as in Example 31, except that each of the additives E and I was used instead of the additive D, polyethylene glycol, in an amount shown in Table 4, that the foam nucleating agent, talc, was used in an amount shown in Table 4, and that the second-stage foaming conditions were as shown in Table 4. Next, second-stage expanded particles having an expansion ratio of 30 times were obtained and subjected to in-mold expansion molding. The first-stage expanded particles thus obtained showed two endothermic peaks at approximately 138° C. and approximately 157° C. in differential scanning calorimetry, and the expansion ratio, the open cell ratio, the average cell diameter L(av), and the cell diameter variation S were as shown in Table 4. As a result of the microscopic observation of the surfaces of the expanded particles subjected to the second-stage foaming, the expanded particles were found to be uniform in diameter of cells in the surfaces, to have smooth surfaces, and to be small in number of thin parts of the surface membranes thereof. The second-stage expanded particles were subjected to the in-mold expansion molding to give an in-mold expanded molded product. The in-mold expanded molded product thus obtained had a surface excellent in smoothness and free of wrinkles, was small in dimensional shrinkage, had less distortion, was excellent in fusion between particles, and therefore was good in appearance. However, in Example 33, the in-mold expanded molded products showed slight wrinkles and gaps between particles on their surfaces. The in-mold expanded molded products were satisfactory in fusion between particles. The results are shown in Table 4.

Comparative Example 3

First-stage expanded particles were obtained in the same way as in Example 23, except that the additive D was not used and the second-stage foaming conditions were as shown in Table 5. Next, second-stage expanded particles having an expansion ratio of 30 times were obtained and subjected to in-mold expansion molding. The first-stage expanded particles thus obtained showed two endothermic peaks at approximately 142° C. and approximately 159° C. in differential scanning calorimetry, and the expansion ratio, the open cell ratio, the average cell diameter L(av), and the cell diameter variation S were as shown in Table 5. In particular, the first-stage expanded particles had a cell diameter variation S of 0.5 and therefore were poor in uniformity in cell diameter and varied in size. A high vapor pressure was required in the second-stage foaming for an expansion ratio of 30 times; therefore, a few of the expanded particles agglomerated to each other. Such second-stage expanded particles were subjected to in-mold expansion molding to give an in-mold expanded molded product. The in-mold expanded molded product was high in rate of dimensional shrinkage, had wrinkles and gaps between particles, and was inferior in appearance. The results are shown in Table 5.

TABLE 5

|  |  | Comparative Examples | | | |
| --- | --- | --- | --- | --- | --- |
|  |  | 3 | 4 | 5 | 6 |
| Polyropylene resin |  | B | B | B | C |
| Type of additives |  | N/A | H | L | N/A |
| Amount of additives | Parts by weight | N/A | 1.0 | 1.0 | N/A |
| Talc | Parts by weight | 0.03 | N/A | N/A | 0.05 |
| Initial amount of $CO_2$ | Parts by weight | 14 | 14 | 14 | 6 |
| Expansion ratio | Times | 10 | 5 | 14 | 7 |
| Open cell ratio | % | 0.6 | 1.1 | 2.5 | 0.9 |
| Percentage of volatile content | % | 1.2 | 3.8 | 6.3 | 0.9 |
| Avg. cell diameter L(av) | μm | 280 | 320 | 120 | 210 |
| Cell diameter variation S |  | 0.5 | 0.6 | 0.05 | 0.35 |
| Shrinkage and wrinkles in expanded particles |  | Good | Good | Poor | Good |
| Internal pressure during second-stage foaming | MPa (absolute pressure) | approx. 0.4 | approx. 0.6 | approx. 0.4 | approx. 0.6 |
| Vapor pressure during second-stage foaming | MPa (gage pressure) | approx. 0.09 | approx. 0.11 | approx. 0.07 | approx. 0.10 |
| Second-stage expandability |  | Average | Poor | Good | Poor |
| Surface properties of molded product |  | Poor | Poor | Poor | Average |
| Rate of fusion of molded product |  | Good | Average | Poor | Good |

Comparative Examples 4 and 5

First-stage expanded particles were obtained in the same way as in Example 23, except that each of the additives H and L was used instead of the additive D, polyethylene glycol, in an amount shown in Table 5, that the foam nucleating agent, talc, was used in an amount shown in Table 5, and that the second-stage foaming conditions were as shown in Table 5. Next, second-stage expanded particles having an expansion ratio of 30 times were obtained and subjected to in-mold expansion molding.

The first-stage expanded particles obtained in Comparative Example 4, where the additive H was used and no talc was added, showed two endothermic peaks at approximately 142° C. and approximately 159° C. in differential scanning calorimetry, and the expansion ratio, the open cell ratio, the average cell diameter L(av), and the cell diameter variation S were as shown in Table 5. In particular, the first-stage expanded particles had a cell diameter variation S of 0.6 and therefore were poor in uniformity in cell diameter and varied in size. A high vapor pressure was required in the second-stage foaming for an expansion ratio of 30 times; therefore, many of the expanded particles agglomerated to each other. Such second-stage expanded particles were subjected to in-mold expansion molding to give an in-mold expanded molded product. The in-mold expanded molded product was high in rate of dimensional shrinkage, had wrinkles, and was inferior in appearance.

In Comparative Example 5, where the additive L was used and no talc was added, the first-stage expanded particles were satisfactory in uniformity in cell diameter, but had a small average cell diameter L(av). The expanded particles had many wrinkles, and were shrunk. Furthermore, as a result of in-mold expansion molding, the in-mold expanded molded product had wrinkles and were inferior in fusibility. The results are shown in Table 5.

Comparative Example 6

First-stage expanded particles were obtained in the same way as in Example 31, except that the additive D was not used and the second-stage foaming conditions were as shown in Table 5. Next, second-stage expanded particles having an expansion ratio of 30 times were obtained and subjected to in-mold expansion molding. The first-stage expanded particles thus obtained showed two melting points of approximately 138° C. and approximately 157° C. in differential scanning calorimetry, and the expansion ratio, the open cell ratio, the average cell diameter L(av), and the cell diameter variation S were as shown in Table 5. A high vapor pressure was required in the second-stage foaming for an expansion ratio of 30 times; therefore, many of the expanded particles agglomerated to each other. Such second-stage expanded particles were subjected to in-mold expansion molding to give an in-mold expanded molded product. The in-mold expanded molded product was high in rate of dimensional shrinkage, had surface sinks in addition to wrinkles and gaps between particles, and was inferior in appearance. The results are shown in Table 5.

Example 34

Figure 2:
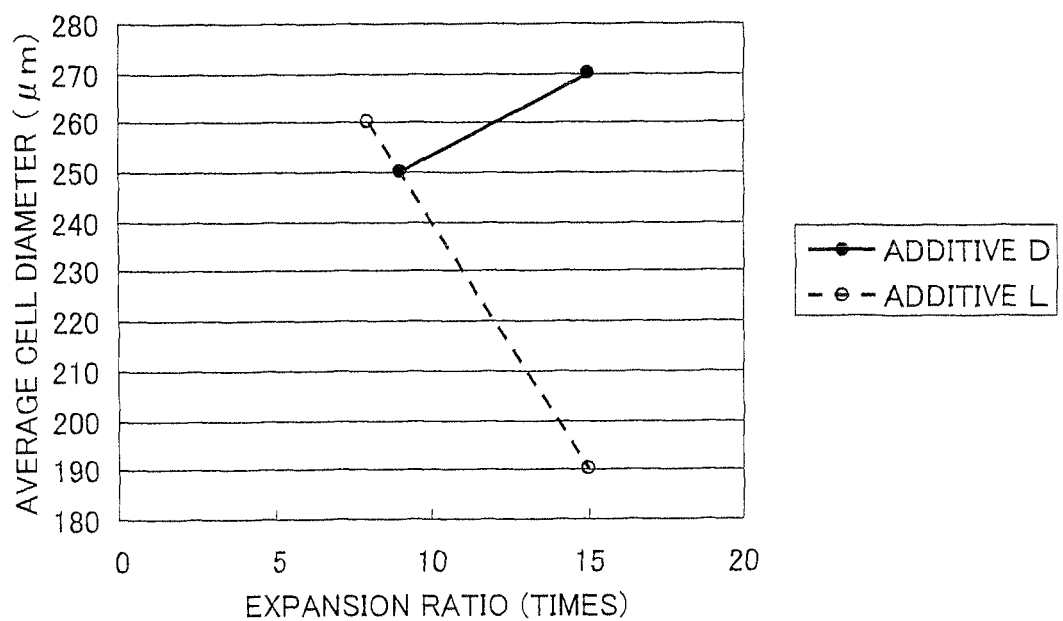
FIG. 2 is a graph showing a relationship between the expansion ratio and the average cell diameter in expanded polypropylene resin particles obtained with varying amounts of additives to have different expansion ratios.

Foaming was carried out in the same way as in Example 23, except that the additive D, polyethylene glycol, was added in 0.1 part by weight, thus giving first-stage expanded particles having two endothermic peaks at approximately 142° C. and approximately 159° C. in differential scanning calorimetry. The first-stage expanded particles had an expansion ratio of 9 times and an average cell diameter L(av) of 250 μm. FIG. 2 shows a relationship between the expansion ratio and the average cell diameter, including the results of Example 23. The first-stage expanded particles obtained as mentioned above and the first-stage expanded particles obtained in Example 23 were subjected to in-mold expansion molding after setting the internal air pressure at approximately 0.2 MPa (absolute pressure) through pressuring them with air in their respective pressure-resistant closed vessels. The rate of fusion of each in-mold expanded molded product was evaluated. The results are shown in Table 6.

In this example, the average cell diameter varies only slightly in response to a change in the expansion ratio. This shows that the expansion ratio can be controlled without influence of a change in the average cell diameter. Further, it is shown that an increase in the expansion ratio does not lead to degradation in fusibility of the in-mold expanded molded product.

TABLE 6

|  |  | Example 34 | | Comp. Example 7 | |
|---|---|---|---|---|---|
| Additives |  | D | | L | |
| Amount of additives | Parts by weight | 0.1 | 0.5 | 0.01 | 0.1 |
| Talc | Parts by weight | 0.03 | 0.03 | — | — |
| Expansion ratio | Times | 9 | 15 | 8 | 15 |
| Avg. cell diameter L (av) | μm | 250 | 270 | 260 | 190 |
| Rate of fusion of molded product |  | Very good | Very good | Very good | Average |

Comparative Example 7

Foaming was carried out in the same way as in Comparative Example 5, except that the additive L, zinc borate, was added in 0.01 part by weight or in 0.1 part by weight, thus giving first-stage expanded particles having two endothermic peaks at approximately 142° C. and approximately 159° C. in differential scanning calorimetry. When the additive L was added in 0.01 part by weight, the expansion ratio was 8 times and the average cell diameter L(av) was 260 μm. When the additive L was added in 0.1 part by weight, the expansion ratio was 15 times and the average cell diameter L(av) was 190 μm. FIG. 2 shows a relationship between the expansion ratio and the average cell diameter. The first-stage expanded particles were subjected to in-mold expansion molding after setting the internal air pressure at approximately 0.2 MPa (absolute pressure) through pressuring them with air in their respective pressure-resistant closed vessels. The rate of fusion of each in-mold expanded molded product was evaluated. The results are shown in Table 6.

In this comparative example, the average cell diameter varies widely in response to an increase in the expansion ratio. This shows that it is difficult to control the expansion ratio without causing a significant change in the average cell diameter. Further, it is shown that an increase in the expansion ratio leads to degradation in fusibility of the in-mold expanded molded product.

INDUSTRIAL APPLICABILITY

Expanded polyolefin resin particles thus obtained can be processed into in-mold expanded molded products of polyolefin resin by in-mold expansion molding, which has conventionally been known. For example, such methods as follows can be used: (1) a method including subjecting the expanded polyolefin resin particles to pressure treatment with an inorganic gas such as air or nitrogen, impregnating the pre-expanded particles with an inorganic gas to impart a predetermined internal pressure to the pre-expanded particles, filling a mold with the pre-expanded particles, and fusing the pre-expanded particles by heat of water vapor; (2) a method including filling a mold with the expanded polyolefin resin particles by compressing the expanded polyolefin resin particles with gas pressure, fusing the expanded polyolefin resin particles by heat of water vapor with use of the resilience of the pre-expanded particles; and (3) a method including filling a mold with the expanded polyolefin resin particles without particular pretreatment and fusing the expanded polyolefin resin particles by heat of water vapor.

The invention claimed is:

1. A process for producing expanded polyolefin resin particles with use as a foaming agent of water contained in an aqueous dispersion medium, the process including the steps of: dispersing polyolefin resin particles together with the aqueous dispersion medium into a closed vessel; heating the polyolefin resin particles up to or above a softening temperature of the polyolefin resin particles and pressurizing the polyolefin resin particles; and releasing the polyolefin resin particles into a zone whose pressure is lower than an internal pressure of the closed vessel, the polyolefin resin particles being composed of a polyolefin resin composition comprising:
polyolefin resin;
polyvalent alcohol in not less than 0.05 parts by weight to not more than 2 parts by weight to 100 parts by weight of the polyolefin resin, the polyvalent alcohol having a carbon number of not less than 3 to not more than 6 and three or more hydroxyl groups; and
a foam nucleating agent.

2. The process as set forth in claim 1, wherein the polyvalent alcohol having a carbon number of not less than 3 to not more than 6 and three or more hydroxyl groups is one or more types selected from among glycerin, diglycerin, pentaerythritol, trimethylolpropane, sorbitol, and D-mannitol.

3. The process as set forth in claim 1, wherein the polyvalent alcohol having a carbon number of not less than 3 to not more than 6 and three or more hydroxyl groups is glycerin.

4. The process as set forth in claim 3, wherein the glycerin is added in not less than 0.05 parts by weight to not more than 0.5 parts by weight to 100 parts by weight of the polyolefin resin.

5. Expanded polyolefin resin particles that are obtained by a process as set forth in claim 1, said expanded polyolefin resin particles containing not less than 0.05% by weight to not more than 2% by weight of the polyvalent alcohol having a carbon number of not less than 3 to not more than 6 and three or more hydroxyl groups, said expanded polyolefin resin particles having an expansion ratio of not less than 10 times to not more than 45 times and an average cell diameter of not less than 50 μm to not more than 800 μm, said expanded polyolefin resin particles having a crystal structure that exhibits two or more melting points on a DSC curve that is obtained by raising a temperature of the expanded polyolefin resin particles from 40° C. to 220° C. at a heating rate of 10° C./min in differential scanning calorimetry.

6. The process as set forth in claim 1, wherein the polyolefin resin particles are composed of a polyolefin resin composition containing the foam nucleating agent in not less than 0.005 parts by weight to not more than 2 parts by weight to 100 parts by weight of the polyolefin resin.

7. The process as set forth in claim 1, said process involving concomitant use of carbon dioxide as a foaming agent.

8. A polyolefin resin in-mold expanded molded product that is obtained by filling a mold with expanded polyolefin resin particles as set forth in claim 5 and heating the expanded polyolefin resin particles.

* * * * *